(12) United States Patent
Binkert et al.

(10) Patent No.: US 10,769,148 B1
(45) Date of Patent: Sep. 8, 2020

(54) RELOCATING DATA SHARING OPERATIONS FOR QUERY PROCESSING

(71) Applicant: Amazon Technologies, Inc., Seattle, WA (US)

(72) Inventors: Nathan Binkert, Redwood City, CA (US); Mengchu Cai, San Jose, CA (US); Martin Grund, Lafayette, CA (US); Maor Kleider, San Mateo, CA (US); Michail Petropoulos, San Francisco, CA (US); Ippokratis Pandis, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 369 days.

(21) Appl. No.: 15/714,834

(22) Filed: Sep. 25, 2017

(51) Int. Cl.
*G06F 16/00* (2019.01)
*G06F 16/2453* (2019.01)
*G06F 16/2455* (2019.01)

(52) U.S. Cl.
CPC .... *G06F 16/24542* (2019.01); *G06F 16/2455* (2019.01)

(58) Field of Classification Search
CPC ......... G06F 16/24539; G06F 16/24542; G06F 16/2455; G06F 16/2453
See application file for complete search history.

(56) References Cited

U.S. PATENT DOCUMENTS

| 6,092,062 | A | 7/2000 | Lohman et al. |
| 7,574,424 | B2 | 8/2009 | Chowdhuri |
| 7,849,073 | B2 | 12/2010 | Young-Lai |
| 9,268,815 | B2 | 2/2016 | Chen et al. |
| 9,311,354 | B2 | 4/2016 | Sun et al. |
| 2010/0281017 | A1* | 11/2010 | Hu ...................... G06F 16/2455 707/718 |
| 2017/0147639 | A1* | 5/2017 | Lee ................... G06F 16/24539 |

OTHER PUBLICATIONS

U.S. Appl. No. 15/389,318, filed Dec. 22, 2016, Ippokratis Pandis et al.
U.S. Appl. No. 15/382,326, filed Dec. 16, 2016, Ippokratis Pandis et al.
U.S. Appl. No. 15/382,334, filed Dec. 16, 2016, Ippokratis Pandis et al.

* cited by examiner

*Primary Examiner* — Cheryl Lewis
(74) *Attorney, Agent, or Firm* — Robert C. Kowert; Kowert, Hood, Munyon, Rankin & Goetzel, P.C.

(57) ABSTRACT

Relocating data sharing operations for query processing may be implemented when generating plans to perform a query. A query operation that causes a node to share data obtained from a different set of nodes with other nodes in a same set of nodes may be identified. The identified query operation may be replaced with another operation that causes the different set of nodes to share the data directly with the other nodes in the same set of nodes.

20 Claims, 17 Drawing Sheets

```
SELECT                                          710
  A.ORDERKEY, B.ORDERKEY
FROM                                          ┌ remote
  REMOTE_STORE.A CUSTOMER_ORDER_ITEM_DETAILS A,  tables join 712
  REMOTE_STORE.B CUSTOMER_ORDER_ITEM_DETAILS B,
WHERE
  A.SHIPDATE = B.SHIPDATE;
```
*FIG. 7A*
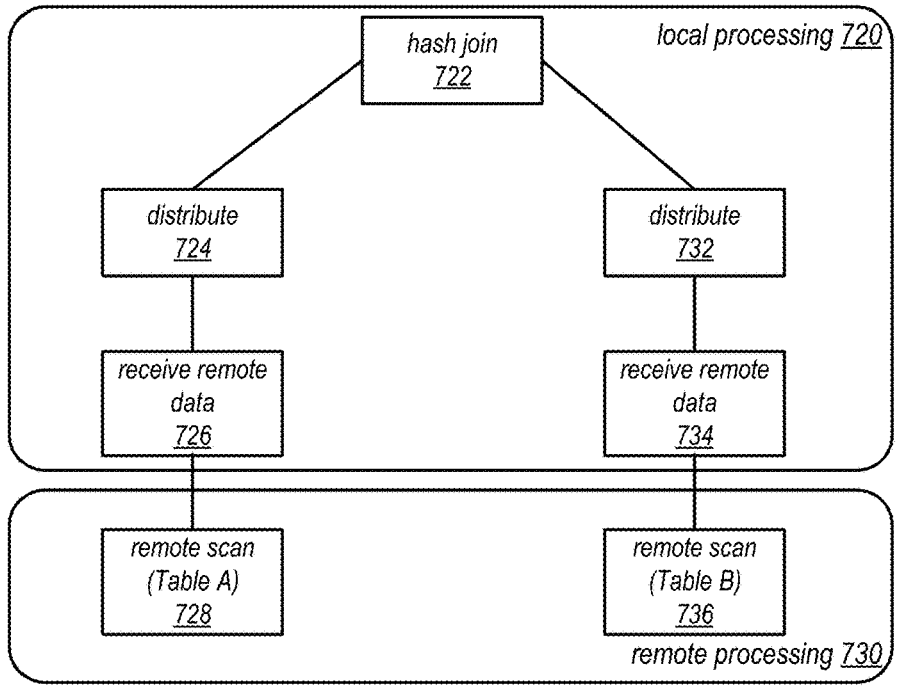
*FIG. 7B*
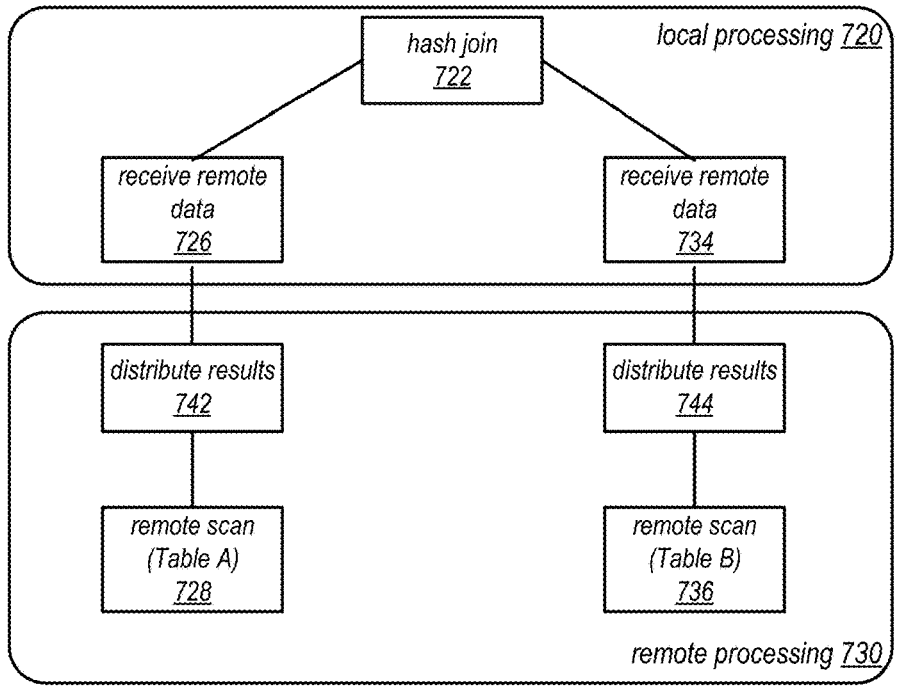
*FIG. 7C*

```
SELECT                                              810
    C.CUSTOMER_KEY, NAME,
    SUM(L.PRICE, L.QUANTITY)SALES
FROM
    REMOTE_STORE.C_CUSTOMER C,            remote
    LOCAL_STORE.LINE_ITEM L               table/local table
WHERE                                     join 812
    C.CUSTOMER_KEY = L.ORDER_KEY
GROUP BY
    C.CUSTOMER_KEY, C.NAME
ORDER BY 3 DESC LIMIT 20;
```
*FIG. 8A*
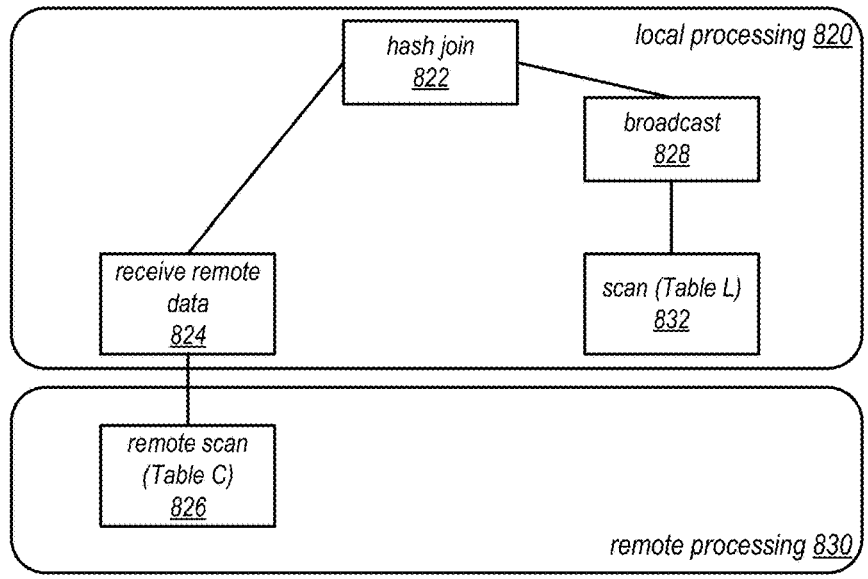
*FIG. 8B*
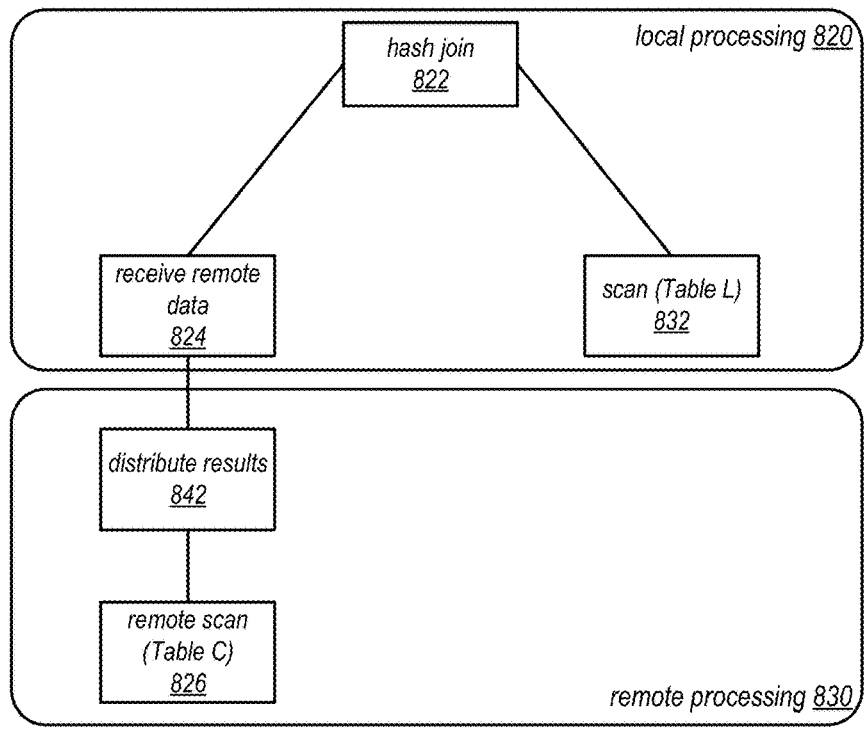
*FIG. 8C*

```
SELECT                                              910
  RETURN_FLAG,
  COUNT(*) AS NUM
FROM
  REMOTE_STORE.LINE_ITEM L1,         unknown
  LOCAL_STORE.ORDERS O               cardinality for join
WHERE                                     912
  O.ORDER_KEY = L1.ORDER_KEY
GROUP BY
  RETURN_FLAG;
```
*FIG. 9A*
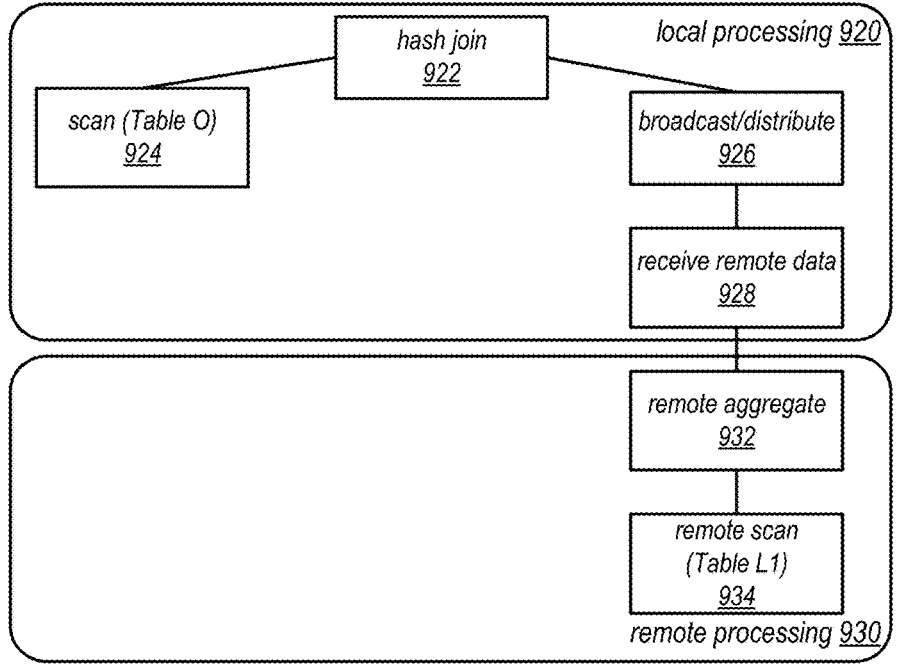
*FIG. 9B*
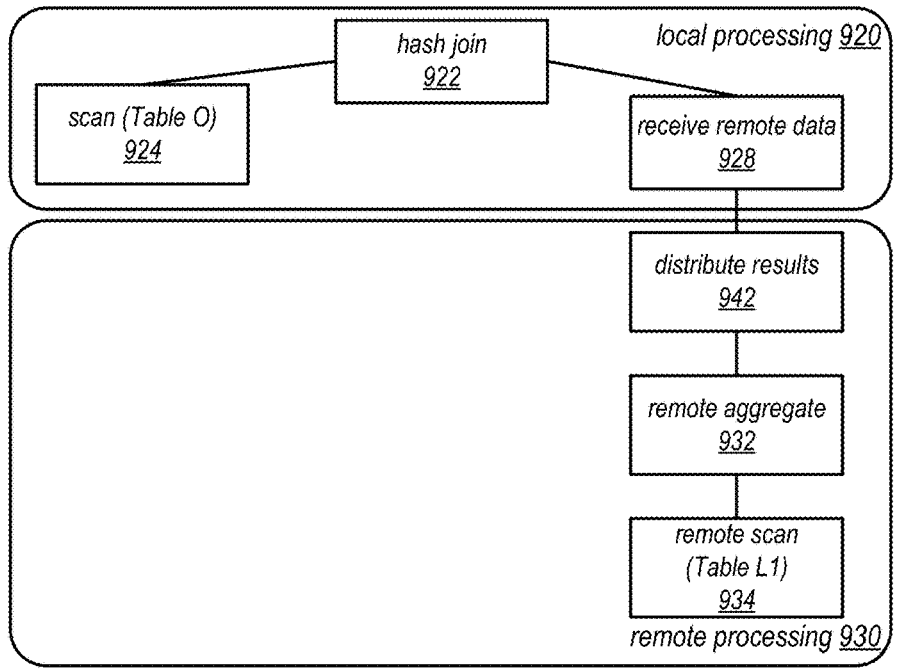
*FIG. 9C*

```
SELECT                                    1110
  DISTINCT BIG_INT
FROM                              partial sort
  REMOTE_STORE.TEST2 T2               1112
ORDER BY 1;
```
FIG. 11A
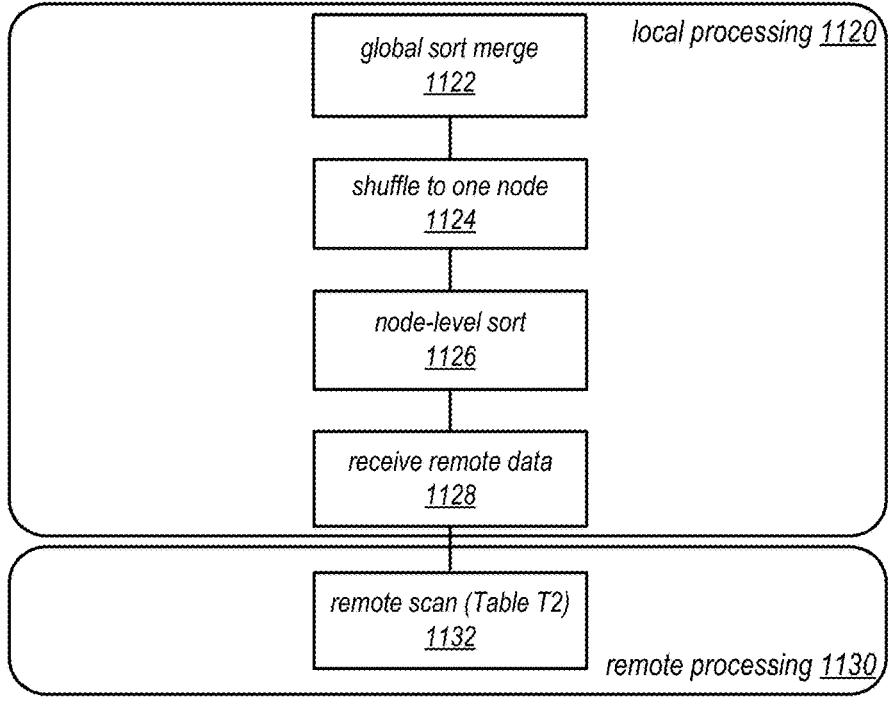
FIG. 11B
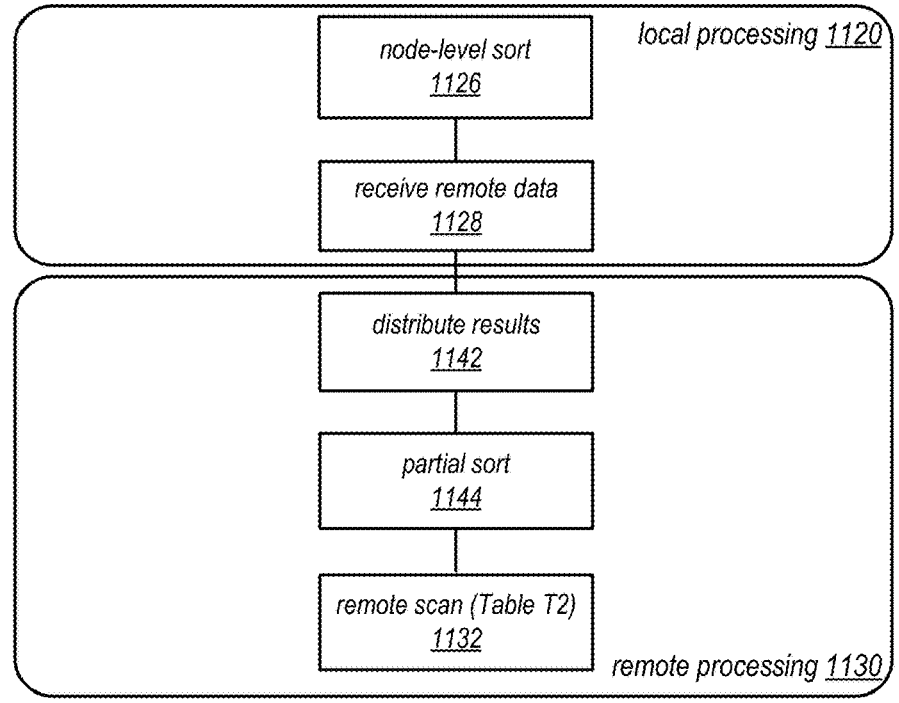
FIG. 11C

RELOCATING DATA SHARING OPERATIONS FOR QUERY PROCESSING

BACKGROUND

As the technological capacity for organizations to create, track, and retain information continues to grow, a variety of different technologies for managing and storing the rising tide of information have been developed. Different storage systems, database systems, and other data processing platforms may provide clients with standard or customized configurations of hardware and software to manage stored information. Because many data management and storage solutions are available, it is difficult for users to select a data management and solution that satisfies current storage needs without blocking future data accessibility as data management and storage solutions change. Therefore, data often becomes stored or distributed across different locations, in different formats, making subsequent attempts to analyze or otherwise process the distributed data collectively difficult to perform.

BRIEF DESCRIPTION OF THE DRAWINGS

FIGS. 7A-7C are logical block diagrams illustrating modifications to a query plan to relocate a data sharing operation for remote processing when performing a join operation between remote data, according to some embodiments.

FIGS. 8A-8C are logical block diagrams illustrating modifications to a query plan to relocate a data sharing operation for remote processing when performing a join operation between remote data and local data, according to some embodiments.

FIGS. 9A-9C are logical block diagrams illustrating modifications to a query plan to relocate a data sharing operation for remote processing when performing a join operation with unknown cardinality, according to some embodiments.

FIGS. 11A-11C are logical block diagrams illustrating modifications to a query plan to relocate a data sharing operation for remote processing when performing partial sortation of remote data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Figure 1A:
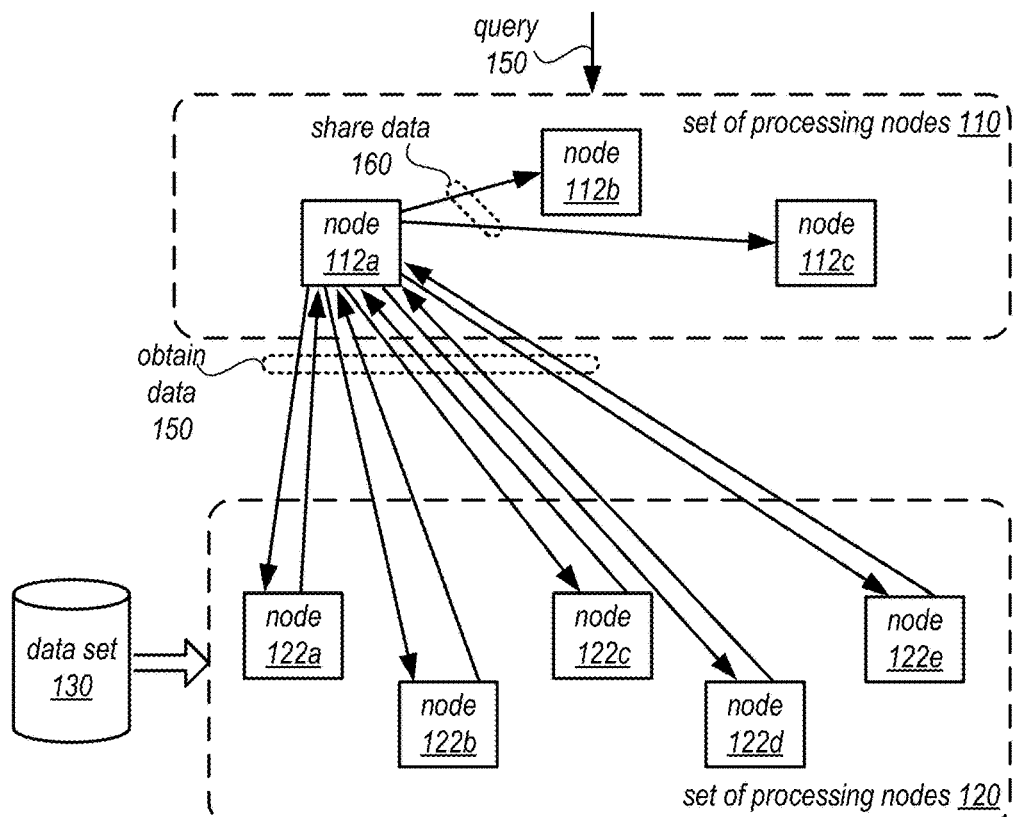
FIGS. 1A-1B illustrate logical block diagrams of relocating data sharing operations for query processing, according to some embodiments.
Figure 1B:
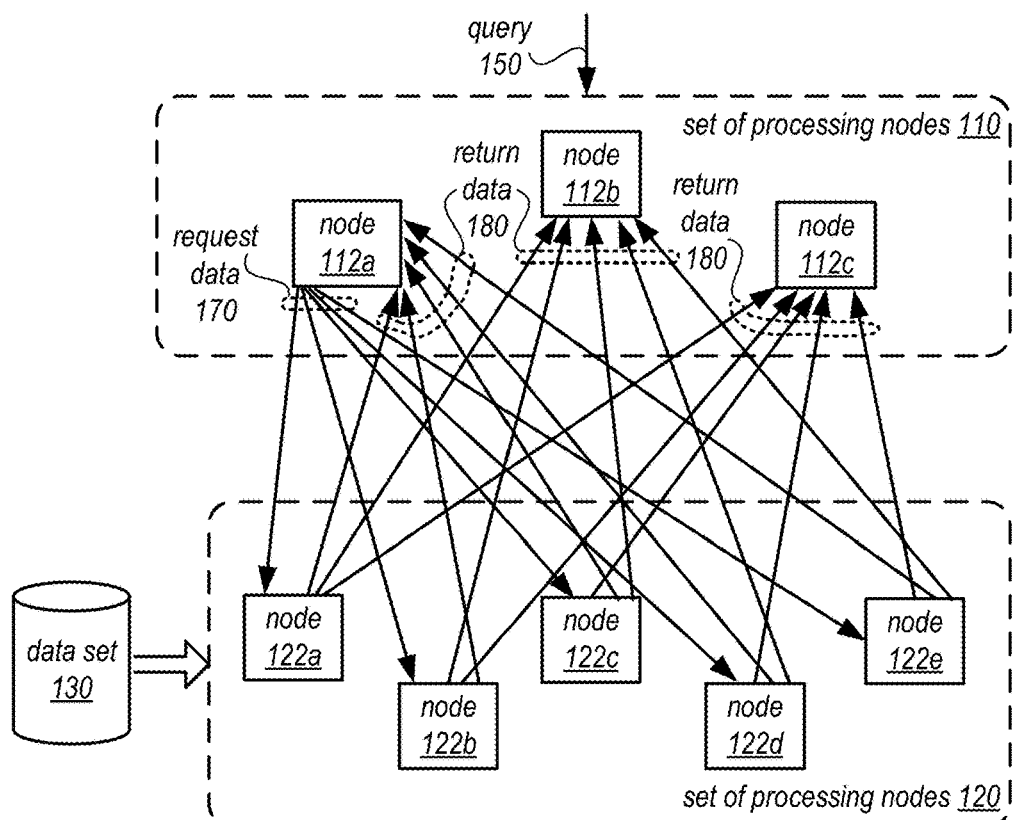

Various embodiments of relocating data sharing operations for query processing are described herein. Data is generated, collected, and stored in diverse locations, in various embodiments. Federated data processing for distributed data may be implemented in various embodiments, so that data processing may be distributed across different data processing engines which access the different data objects in different locations. The different data processing engines or platforms used to access the different data objects may be leveraged to reduce the processing burdens or costs imposed on other data engines, such as by relocating data sharing operations from the nodes of one data processing engine to another, in some embodiments. In this way, the costs of sharing operations in one data processing engine or platform may be significantly reduced if the results of operations received from another data processing engine platform are sent to the appropriate node to perform processing, removing the burden of sharing the received results at one node that requested the operation with other nodes (e.g., effectively removing the "middleman"). FIGS. 1A and 1B illustrate logical block diagrams of relocating data sharing operations for query processing, according to some embodiments.

In FIG. 1A, a first set of processing nodes 110 may include nodes 112a, 112b and 112c (e.g., like data warehouse processing cluster nodes in data warehouse service 300 discussed below with regard to FIGS. 3-6 and 12), which may perform a received query 150. The query may be directed to data that is not local or accessible to processing nodes 110, and thus in some embodiments federating processing may be implemented to utilize another set of processing nodes 120, which may include nodes 122a, 122b, 122c, 122d, and 122e (e.g., like processing nodes in format independent data processing 220 discussed below with regard to FIGS. 2-6 and 12). For example requests or operations may be implemented as part of a query plan to obtain data 150 from one or more nodes 122, which may access data set 130 (e.g., identified by query 150) in order perform query 150. The requesting node 112a may then share the data of the results 160 with other nodes (e.g., 112b and 112c) in order to complete processing of the query (e.g., joining the results with other data obtained or processed by nodes 112b and 112c).

While the operations described in FIG. 1A may achieve the desired results of query 150, the costs incurred by having node 112a share data 160 with other nodes 112 in order to complete the query may be eliminated by relocating the data sharing operation as depicted in FIG. 1B. For example, while node 112a may still perform an initial request to the nodes 122 to obtain the data from data set 130, the nodes 122 may also be caused to distribute the results directly to nodes 112b and 112c in addition to node 112a. Note that in some embodiments, other distributions of results may be desirable in order to perform query 150 (e.g., where either 112b, 112c, or both 112b and 112c receive the results of instead of node 112a). The operation in a query plan that causes the sharing of data 160 may be identified and replaced with another operation that cause the distribution of results as illustrated in FIG. 1B, as discussed in detail below with regard to FIGS. 6-16.

Please note that the previous description of relocating data sharing operations for query processing is a logical illustration and thus is not to be construed as limiting as to the implementation of a data processor, a data store, a data set (or portions thereof), number or combination of nodes in a set.

This specification begins with a general description of a provider network that implements multiple different services, including data processing services and storage services, which may perform relocating data sharing operations for query processing. Then various examples of multiple data processors, such as a data warehouse service and a format independent data processing service, including different components/modules, or arrangements of components/module that may be employed as part of implementing the data processors are discussed. A number of different methods and techniques to implement relocating data sharing operations for query processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
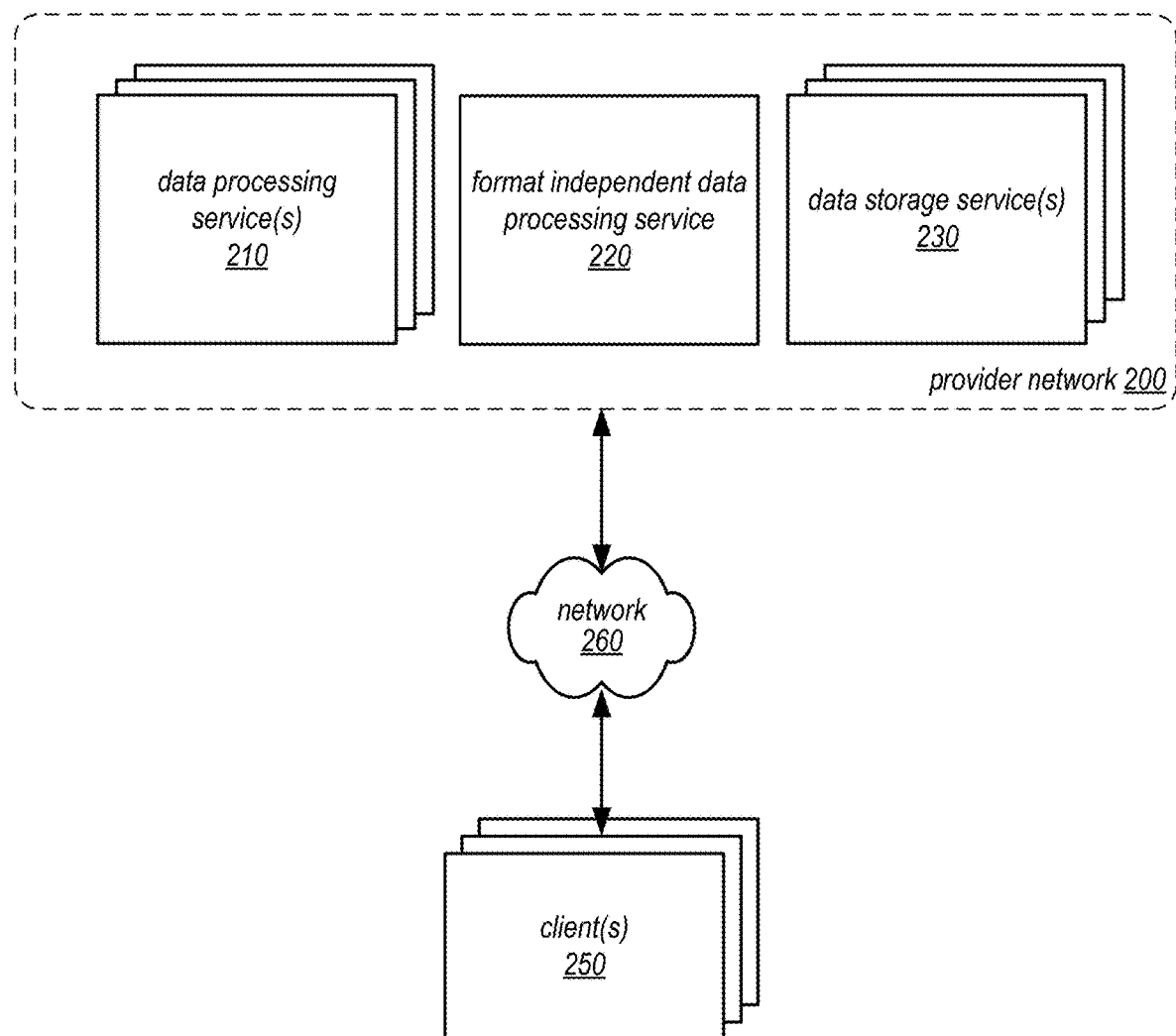
FIG. 2 is a logical block diagram illustrating a provider network offering data processing services that utilize a format independent data processing service that relocate data sharing operations for query processing, according to some embodiments.

FIG. 2 is a logical block diagram illustrating a provider network offering data processing services that utilize a format independent data processing service that relocate data sharing operations for query processing, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 17), needed to implement and distribute the infrastructure and storage services offered by the provider network 200. In some embodiments, provider network 200 may implement various computing resources or services, such as data processing service(s) 210, (e.g., a map reduce service, a data warehouse service, and other large scale data processing services or database services), format independent data processing service 220, and data storage services 230 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 17 and described below. In various embodiments, the functionality of a given system or service component (e.g., a component of data processing service 210, format independent data processing service 220, or data storage service 230) may be implemented by a particular node or may be distributed across several nodes. In some embodiments, a given node may implement the functionality of more than one service system component (e.g., more than one data store component).

Data processing services 210 may be various types of data processing services that perform general or specialized data processing functions (e.g., anomaly detection, machine learning, data mining, big data querying, or any other type of data processing operation). For example, in at least some embodiments, data processing services 210 may include a map reduce service that creates clusters of processing nodes that implement map reduce functionality over data stored in the map reduce cluster as well as data stored in one of data storage services 230. In another example, data processing service(s) 210 may include various types of database services (both relational and non-relational) for storing, querying, and updating data. Such services may be enterprise-class database systems that are highly scalable and extensible. Queries may be directed to a database in data processing service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service(s) 210 may implement, in some embodiments, a data warehouse service, such as discussed below with regard to FIG. 3 that utilizes another data processing service, such as format independent data processing service 220, to execute portions of queries or other access requests with respect to data that is stored in a remote data store, such as data storage service(s) 230 (or a data store external to provider network 200) to implement tiered data processing for distributed data sets.

Format independent data processing service 220, as discussed in more detail below with regard to FIGS. 3-6, may provide a service supporting many different data or file formats for data stored in a centralized data store, like one (or more) of data storage service(s) 230. Instead of reformatting (if the format of data in remote storage is not supported by the data processing service(s) 210) and moving data from data storage service(s) 230 into the data processing service(s) 210, format independent data processing service 220 may efficiently read data from data storage service(s) 230 according to the data format in which the data is already stored in data storage service(s) 230. Format independent data processing service may perform requested operations, such as scan operations that filter or project data results, aggregation operations that aggregate data values and provide partial or complete aggregation results, sorting, grouping, or limiting operations that organize or reduce the determined data results from data in data storage service(s) 230 in order to minimize the amount of data transferred out of data storage service(s) 230. For example, format independent data processing service 220 may execute different operations that are part of a larger query plan generated at a data processing service 210 (such as discussed above with regard to FIG. 1 and below with regard to FIGS. 5-12) and provide results to the data processing service 210 by relying upon requests from data processing service(s) 210 to determine the different operations to perform. In this way, format independent data processing service 220 may be implemented as a dynamically scalable and stateless data processing service that is fault tolerant without the need to support complex query planning and execution for multiple different data formats. Instead, format independent data processing service 230 may offer a set of data processing capabilities to access data stored in a wide variety of data formats (which may not be supported by different data processing service(s) 210) that can be programmatically initiated on behalf of another data processing client, such as data processing service 210.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, format independent data processing service 220 may access data objects stored in data storage services via the programmatic interfaces (as discussed below with regard to FIG. 12).

Generally speaking, clients 250 may encompass any type of client that can submit network-based requests to provider network 200 via network 260, including requests for storage services (e.g., a request to query a data processing service 210, or a request to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210, format independent data processing service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service, like data warehouse service 300 in FIG. 3 below) or data stored in a data lake hosted in data storage service(s) 230 by performing federated data processing between the data processing service 210 and format independent data processing service 220 (as discussed below with regard to FIGS. 5-12).

Clients 250 may convey network-based services requests (e.g., access requests to read or write data may be directed to data in data storage service(s) 230, operations, tasks, or jobs, being performed as part of data processing service(s) 220, or to interact with data catalog service 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
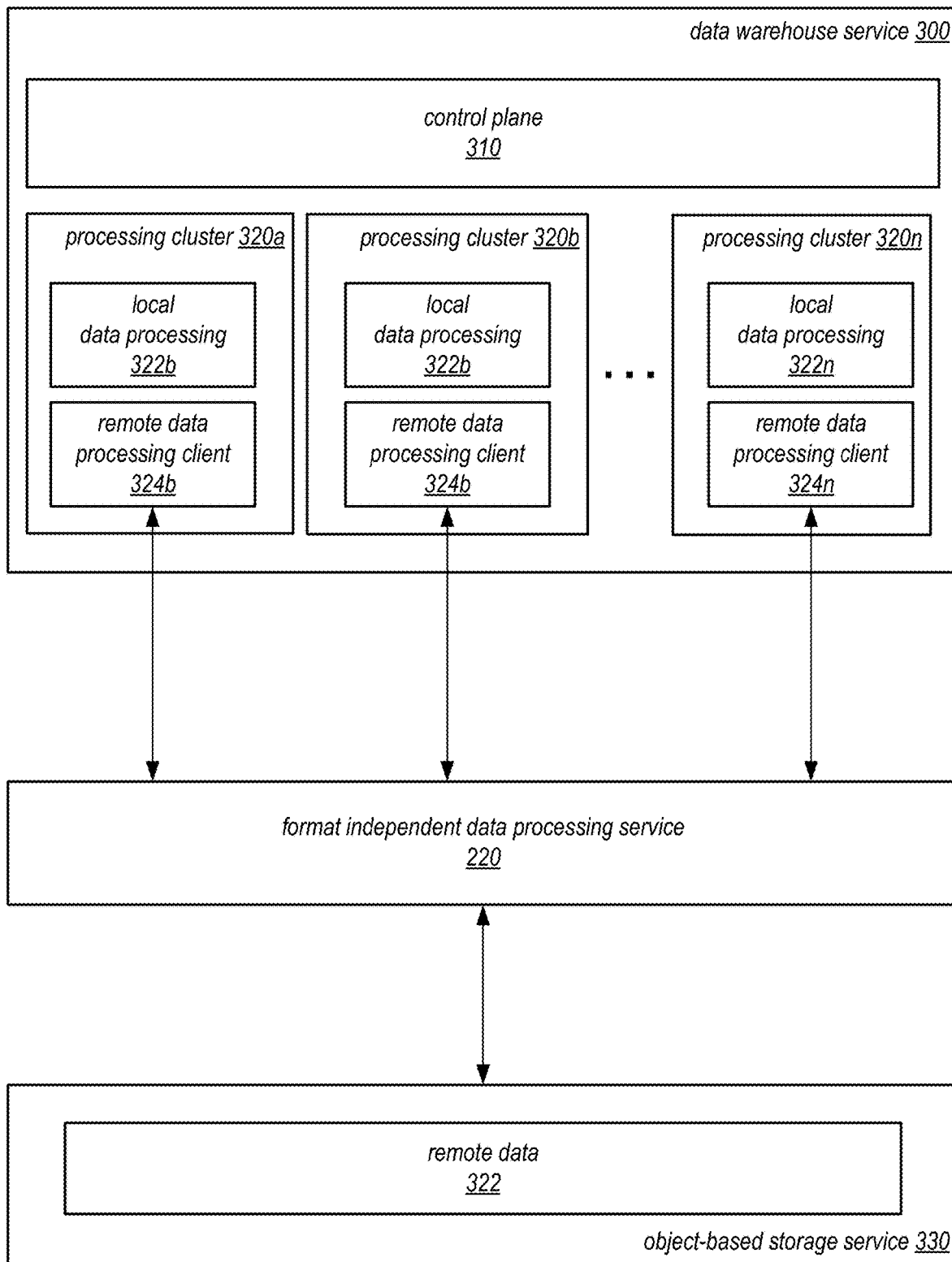
FIG. 3 is a logical block diagram of a data warehouse service that utilizes a format independent data processing service to perform federated processing for data stored outside of the data warehouse service, according to some embodiments.

In at least some embodiments, one of data processing service(s) 220 may be a data warehouse service. FIG. 3 is a logical block diagram of a data warehouse service that utilizes a format independent data processing service to perform federated processing for data stored outside of the data warehouse service, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of relational database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 2000 described below with regard to FIG. 17. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300.

As discussed above, various clients (or customers, organizations, entities, or users) may wish to store and manage data using a data management service. Processing clusters may respond to various requests, including write/update/store requests (e.g., to write data into storage) or queries for data (e.g., such as a Server Query Language request (SQL) for particular data), as discussed below with regard to FIG. 5, along with many other data management or storage services. Multiple users or clients may access a processing cluster to obtain data warehouse services. In at least some embodiments, a data warehouse service 300 may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320a, 320b, through 320n, hosted by the data warehouse service 300 may provide an enterprise-class database query and management system that allows users to send data processing requests to be executed by the clusters 320, such as by sending a query to a cluster control interface implemented by the network-based service. Processing clusters 320 may perform data processing operations with respect to data stored locally in a processing cluster, as well as remotely stored data. For example, object-based storage service 330 may be a data storage service 230 implemented by provider network 200 that stores remote data 322. Queries sent to a processing cluster 320 may be directed to local data stored in the processing cluster and/or remote data 322. Therefore, processing clusters may implement local data processing, such as local data processing 322a, 322b, and 322c (discussed below with regard to FIGS. 5-11C) to plan and execute the performance of queries with respect to local data in the processing cluster, as well as a remote data processing client, such as remote data processing clients 324a, 324b, and 324c, to direct execution of different operations determined as part of the query plan generated at the processing cluster that are assigned to format independent data processing service 220 with respect to processing remote data 322.

Scaling clusters 320 may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Figure 4:
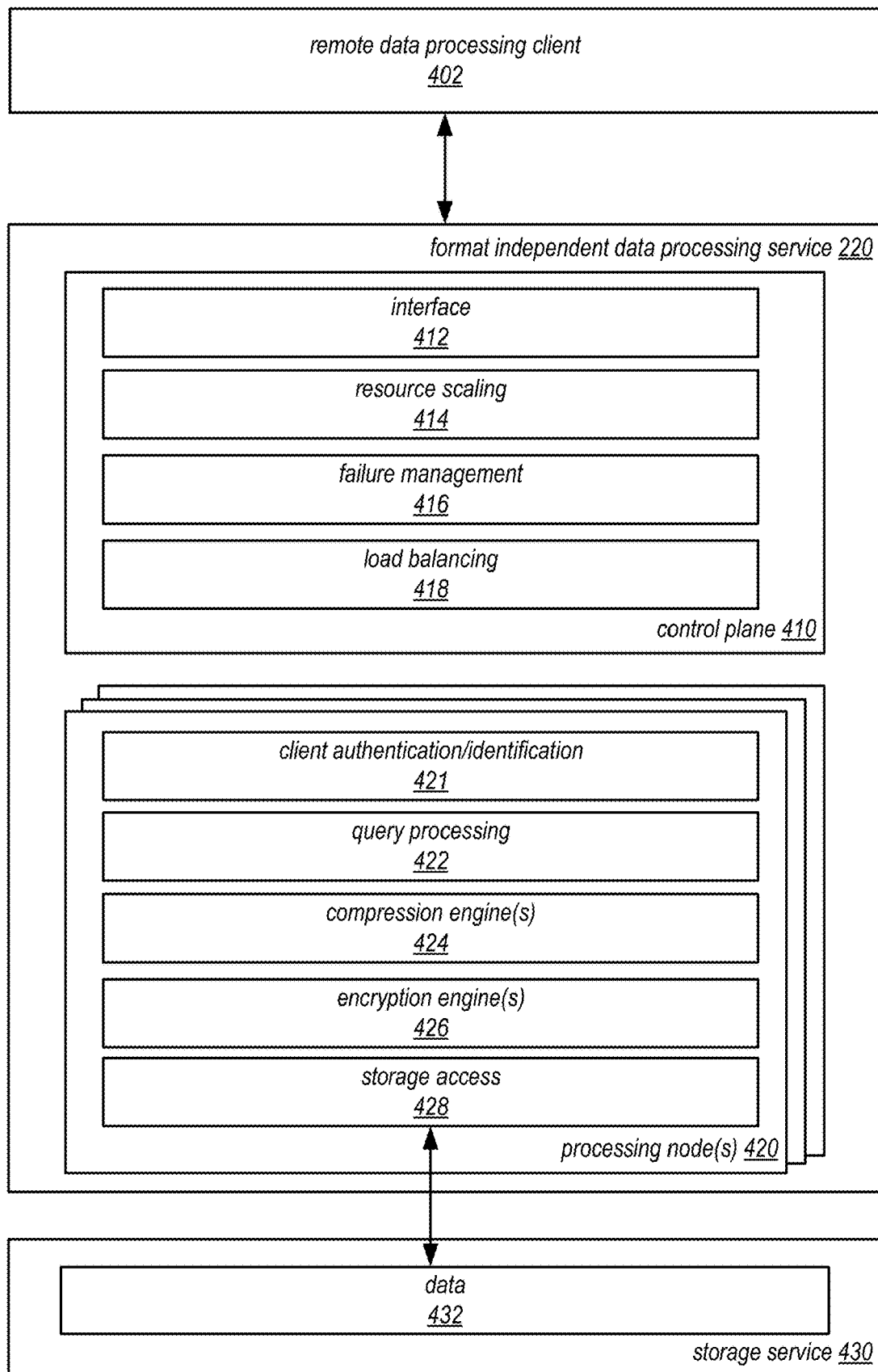
FIG. 4 is a logical block diagram illustrating a format independent data processing service, according to some embodiments.

FIG. 4 is a logical block diagram illustrating a format independent data processing service, according to some embodiments. As noted above in FIG. 2, format independent data processing service 220 may receive requests to perform processing operations with respect to data stored 432 in a data storage service. Processing requests may be received from a client, such as remote data processing client(s) 402 (which may another data processing service 210, like data warehouse service 300 or another data processing client, such as a database engine/cluster or map reduce cluster implemented outside of provider network 200 and communicating with format independent data processing service 220 in order to process queries with respect to data stored within provider network 200 in a data storage service 230 or to process data stored outside of provider network 200 (when the data is made accessible to format independent data processing service 220).

Format independent data processing service 220 may implement a control plane 410 and multiple processing node(s) 420 to execute processing requests received from remote data processing client(s) 402. Control plane 410 may arbitrate, balance, select, or dispatch requests to different processing node(s) 420 in various embodiments. For example, control plane 410 may implement interface 412 which may be a programmatic interface, such as an application programming interface (API), that allows for requests to be formatted according to the interface 412 to programmatically invoke operations. In some embodiments, the API may be defined to allow operation requests defined as objects of code generated at and sent from remote data processing client(s) 402 (based on a query plan generated at remote data processing client(s) 402) to be compiled or executed in order to perform the assigned operations at format independent data processing service 220.

In some embodiments, format independent data processing service 220 may implement load balancing 418 to distribute remote processing requests across different processing node(s) 420. For example, a remote processing request received via interface 412 may be directed to a network endpoint for a load-balancing component of load balancing 418 (e.g., a load balancing server or node) which may then dispatch the request to one of processing node(s) 420 according to a load balancing scheme. A round-robin load balancing, for instance, may be used to ensure that remote data processing requests are fairly distributed amongst processing node(s) 420. However, various other load-balancing schemes may be implemented. As format independent data processing service 220 may receive many remote data processing requests from multiple remote data processing client(s) 402, load balancing 418 may ensure that incoming requests are not directed to busy or overloaded processing node(s) 420.

Format independent data processing service 220 may also implement resource scaling 414. Resource scaling 414 may detect when the current request rate or workload upon a current number of processing node(s) 420 exceeds or falls below over-utilization or under-utilization thresholds for processing nodes. In response to detecting that the request rate or workload exceeds an over-utilized threshold, for example, then resources scaling 414 may provision, spin up, activate, repurpose, reallocate, or otherwise obtain additional processing node(s) 420 to processing received remote data processing requests. Similarly, the number of processing node(s) 420 could be reduced by resource scaling 414 in the event that the request rate or workload of processing node(s) falls below the under-utilization threshold.

Format independent data processing service 220 may also implement failure management 416 to monitor processing node(s) 420 and other components of format independent data processing service 220 for failure or other health or performance states that may need to be repaired or replaced. For example, failure management 416 may detect when a processing node fails or becomes unavailable (e.g., due to a network partition) by polling processing node(s) 420 to obtain health or performance status information. Failure management may initiate shutdown or halting of processing at failing processing node(s) 420 and provision replacement processing node(s) 420.

Figure 17:
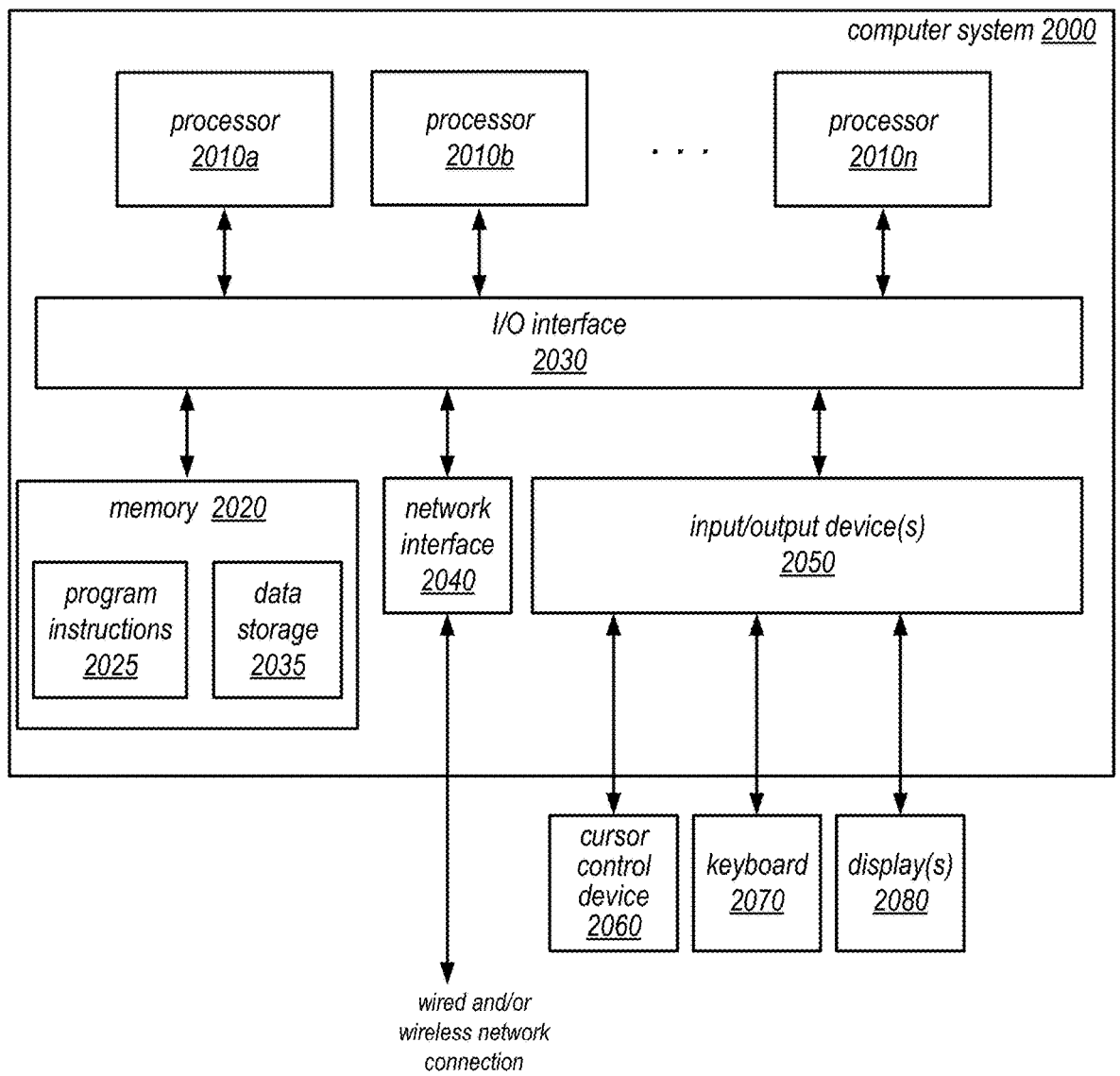
FIG. 17 illustrates an example system that implements the various methods, techniques, and systems described herein, according to some embodiments.

Processing node(s) 420 may be implemented as separate computing nodes, servers, or devices, such as computing systems 2000 in FIG. 17, to perform data processing operations on behalf of remote data processing client(s) 402. Processing node(s) 420 may implement stateless, in-memory processing to execute processing operations, in some embodiments. In this way, processing node(s) 420 may have fast data processing rates. Processing node(s) 420 may implement client authentication/identification 421 to determine whether a remote data processing client 402 has the right to access data 432 in storage service 430. For example, client authentication/identification 421 may evaluate access credentials, such as a username and password, token, or other identity indicator by attempting to connect with storage service 430 using the provided access credentials. If the connection attempt is unsuccessful, then the data processing node 402 may send an error indication to remote data processing client 402.

Processing node(s) 420 may implement query processing 422 which may perform multiple different processing operations and support multiple different data formats. For example, query processing 422 may implement separate tuple scanners for each data format which may be used to perform scan operations that scan data 432 and which may filter or project from the scanned data, search (e.g., using a regular expression) or sort (e.g., using a defined sort order) the scanned data, aggregate values in the scanned data (e.g., count, minimum value, maximum value, and summation), and/or group by or limit results in the scanned data. Remote data processing requests may include an indication of the data format for data 432 so that query processing 422 may use the corresponding tuple scanner for data 432. Query processing 422 may, in some embodiments, transform results of operations into a different data format or schema according to a specified output data format in the remote data processing request.

In some embodiments, data 432 may be stored in encrypted or compressed format. Processing node(s) 420 may implement compression engine(s) 424 to decompress data 432 according to a compression technique identified for data 432, such as lossless compression techniques like run-length encoding, Lempel-Ziv based encoding, or bzip based encoding. Processing node(s) 420 may implement encryption engine(s) 426 to decrypt data 432 according to an encryption technique and/or encryption credential, such as a key, identified for data 432, such as symmetric key or public-private key encryption techniques.

Processing node(s) 420 may implement storage access 428 to format, generate, send and receive requests to access data 432 in storage service 430. For example, storage access 428 may generate requests to obtain data according to a programmatic interface for storage service 430. In some embodiments, other storage access protocols, such as internet small computer interface (iSCSI), may be implemented to access data 432.

Figure 5:
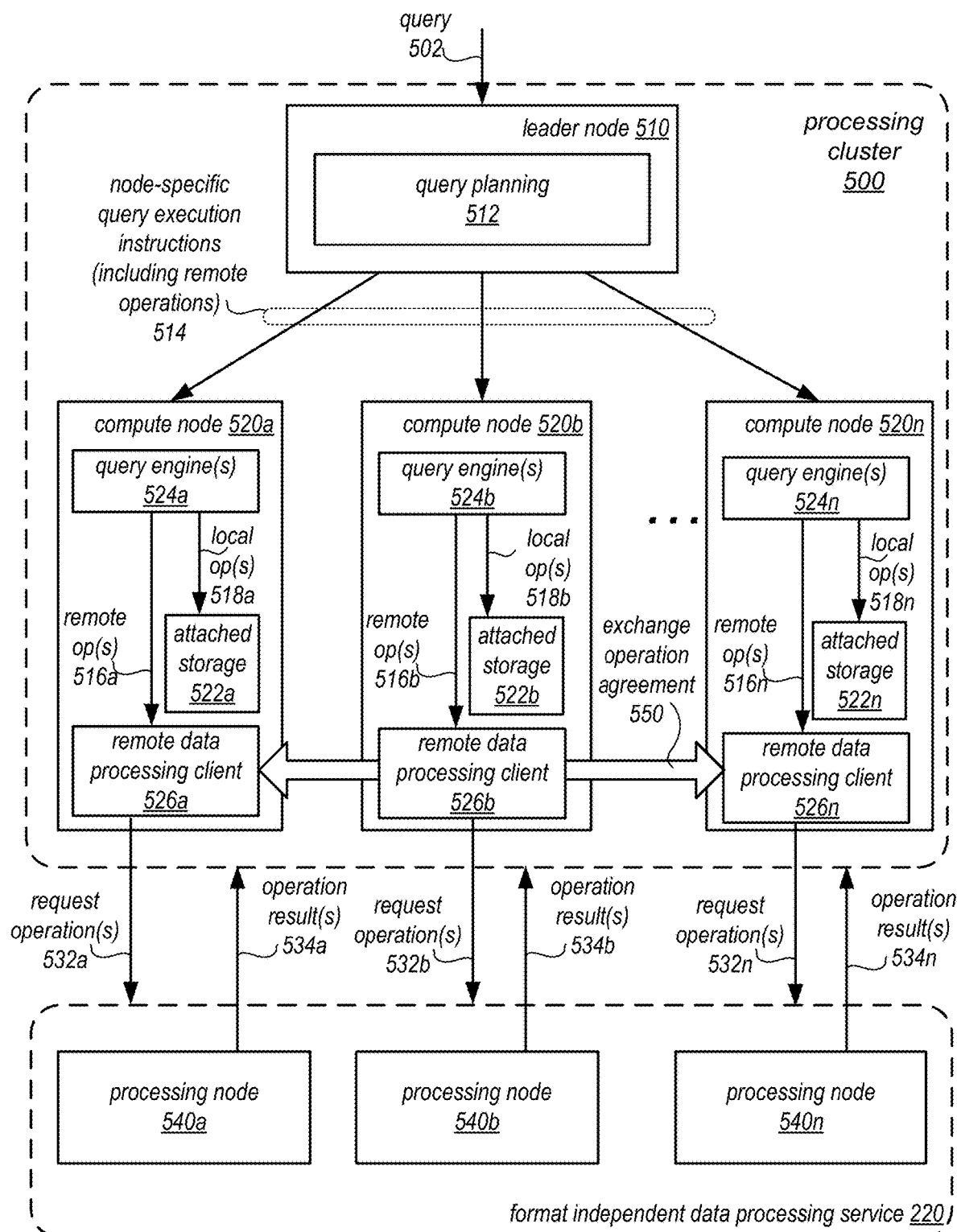
FIG. 5 is a logical block diagram illustrating an example processing cluster of a data warehouse service using a format independent data processing service to perform operations at a remote data store to perform federated processing for a query, according to some embodiments.

FIG. 5 is a logical block diagram illustrating an example processing cluster of a data warehouse service using a format independent data processing service to perform operations at a remote data store to perform federated processing for a query, according to some embodiments. Processing cluster 500 may be data warehouse service cluster, like processing clusters 320 discussed above with regard to FIG. 3, or another processing cluster that distributes execution of a query among multiple processing nodes. As illustrated in this example, a processing cluster 500 may include a leader node 510 and compute nodes 520a, 520b, and 520n, which may communicate with each other over an interconnect (not illustrated). Leader node 510 may implement query planning 512 (discussed in detail below with regard to FIG. 6) to generate query plan(s) and instructions 514 for executing queries on processing cluster 500 that perform tiered data processing. As described herein, each node in a processing cluster 500 may include attached storage, such as attached storage 522a, 522b, and 522n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 500 may be implemented as part of a data warehouse service, as discussed above with regard to FIG. 3, or another one of data processing service(s) 210. Leader node 510 may manage communications with clients, such as clients 250 discussed above with regard to FIG. 2. For example, leader node 510 may be a server that receives a query 502 from various client programs (e.g., applications) and/or subscribers (users), then parses them and develops an execution plan (e.g., query plan(s)) to carry out the associated database operation(s)). More specifically, leader node 510 may develop the series of steps necessary to obtain results for the query. Query 502 may be directed to data that is stored both locally within processing cluster 500 (e.g., at one or more of compute nodes 520) and data stored remotely (which may be accessible by format independent data processing service 220. Leader node 510 may also manage the communications among compute nodes 520 instructed to carry out database operations for data stored in the processing cluster 500. For example, node-specific query instructions 514 may be generated or compiled code that is distributed by leader node 510 to various ones of the compute nodes 520 to carry out the steps needed to perform query 502, including executing the code to generate intermediate results of query 502 at individual compute nodes may be sent back to the leader node 510. Leader node 510 may receive data and query responses or results from compute nodes 520 in order to determine a final result for query 502. A database schema, data format and/or other metadata information for the data stored among the compute nodes, such as the data tables stored in the cluster, may be managed and stored by leader node 510. Query planning 512, as discussed in more detail below with regard to FIG. 6, may account for remotely stored data by generating node-specific query instructions that include remote operations to be directed by individual compute node(s).

Processing cluster 500 may also include compute nodes, such as compute nodes 520a, 520b, and 520n. Compute nodes 520, may for example, be implemented on servers or other computing devices, such as those described below with regard to computer system 2000 in FIG. 17, and each may include individual query processing "slices" defined, for example, for each core of a server's multi-core processor, one or more query processing engine(s), such as query engine(s) 524a, 524b, and 524n, to execute the instructions 514 or otherwise perform the portions of the query plan assigned to the compute node. Query engine(s) 524 may access a certain memory and disk space in order to process a portion of the workload for a query (or other database operation) that is sent to one or more of the compute nodes 520. Query engine 524 may access attached storage, such as 522a, 522b, and 522n, to perform local operation(s), such as local operations 518a, 518b, and 518n. For example, query engine 524 may scan data in attached storage 522, access indexes, perform joins, semi joins, aggregations, or any other processing operation assigned to the compute node 520.

Query engine 524a may also direct the execution of remote data processing operations, by providing remote operation(s), such as remote operations 516a, 516b, and 516n, to remote data processing clients, such as remote data processing client 526a, 526b, and 526n. Remote data processing clients 526 may be implemented by a client library, plugin, driver or other component that sends request operations, such as request operation(s) 532a, 532b, and 532n to format independent data processing service 220. As noted above, in some embodiments, format independent data processing service 220 may implement a common network endpoint to which request operation(s) 532 are directed, and then may dispatch the requests to respective processing nodes, such as processing nodes 540a, 540b, and 540n. Remote data processing clients 526 may read, process, or otherwise obtain results from processing nodes, including partial results of different operations (e.g., aggregation operations) and may provide operation result(s), including result(s) 534a, 534b, and 534c, back to query engine(s) 524, which may further process, combine, and or include them with results of location operations 518. As discussed below with regard to FIGS. 7A-11C and 13-16, in at least some embodiments, the request operations may include operations to distribute results (as part of relocating data sharing operations from compute nodes 520) so that operation results 534 may be sent to both the requesting remote data processing client 526, one or more other remote data processing clients 526, and/or both the requesting and other remote data processing clients 526. As discussed in detail below with regard to FIG. 15, compute node(s) 520 or remote data processing clients 526 may exchange operation agreement communications 550 in order to determine whether the results of a request operation were successfully completed to all nodes that were supposed to receive the results of a requested remote operation 532. If not, the requested operation may be retried, in some embodiments.

Compute nodes 520 may send intermediate results from queries back to leader node 510 for final result generation (e.g., combining, aggregating, modifying, joining, etc.). Remote data processing clients 526 may retry operation request(s) 532 that do not return within a retry threshold. As format independent data processing service 220 may be stateless, processing operation failures at processing node(s) 540 may not be recovered or taken over by other processing nodes 540, remote data processing clients 526 may track the success or failure of requested operation(s) 532, and perform retries when needed.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 6:
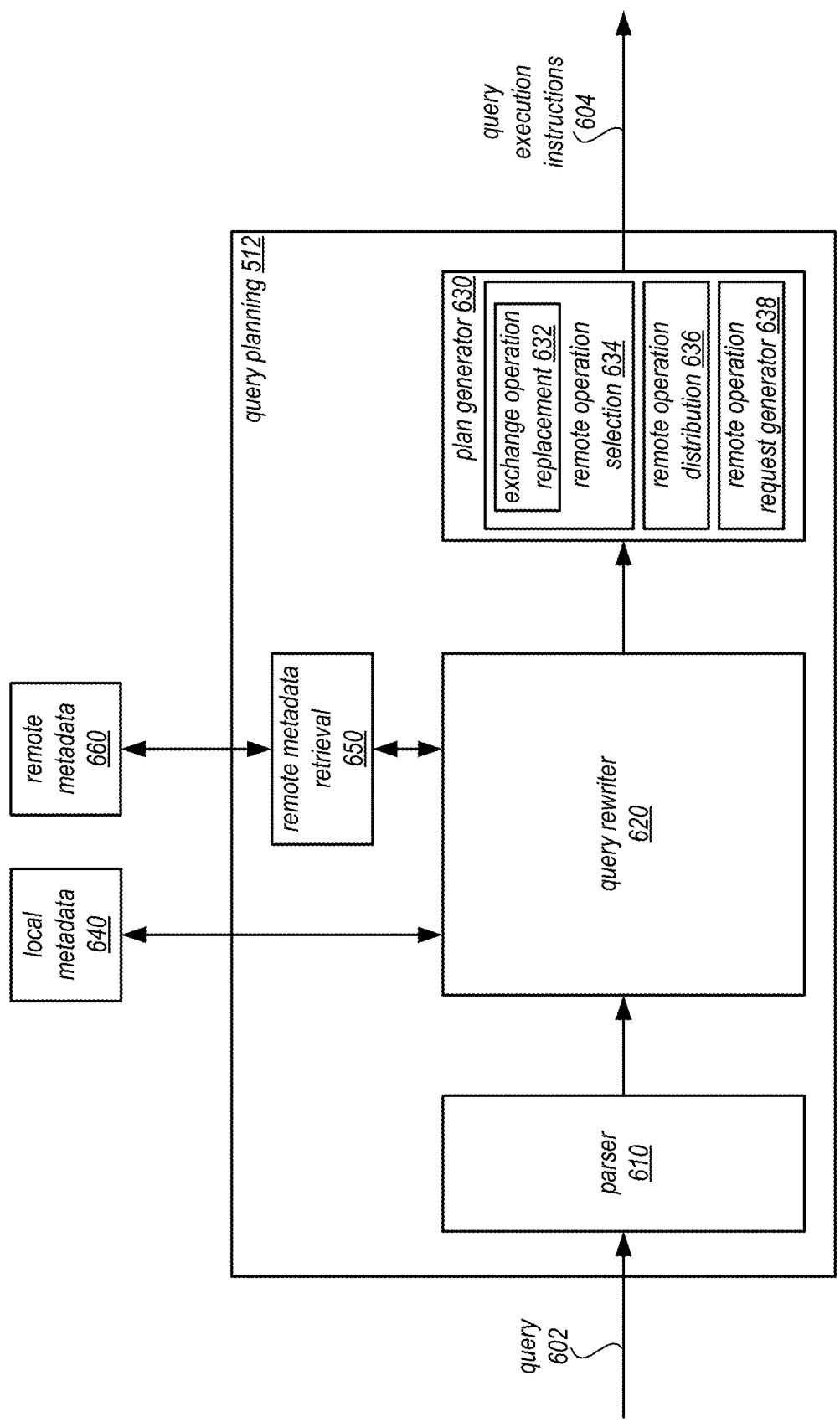
FIG. 6 is a logical block diagram illustrating an example query planning engine that generates query plans that relocate data sharing operations for query processing, according to some embodiments.

FIG. 6 is a logical block diagram illustrating an example query planning engine that generates query plans that relocate data sharing operations for query processing, according to some embodiments. Query planning 512 may implement parser 610 to receive a query statement, such as a SQL statement, and determine the various requested operations to perform as a result of the query. For example, parser 610 may generate a query tree for a given query input string to separate out the various query clauses, fields, predicates, conditions, commands, or other query information for planning and optimization. Query planning 512 may implement query rewriter 620 to rewrite the parsed query based on metadata that describes both the local data and remote data. For example, as illustrated in FIG. 6, query rewriter 620 may have access to local metadata 640 (e.g., table descriptions or definitions, including the names and data types of each column, physical information (e.g., partitions information), number of rows, number of distinct values, value ranges, value cardinality, value distribution, indexes, views, etc.), to rewrite portions of a query tree, such as changing the location or ordering of predicates, join operations, or other portions or operations in the query tree.

As portions of query 602 may be directed to remote data, query rewriter may rely upon metadata describing the remote data, such as remote metadata 660 (e.g., table or descriptions definitions, including the names and data types of each column, physical information (e.g., partitions information), number of rows, number of distinct values, value ranges, value cardinality, value distribution, indexes, views, etc.), to perform query rewrites to optimize execution of portions of the query with respect to remotely stored data. While a client of the processing cluster could provide remote metadata 660 (e.g., as query hints), in some embodiments query planning 512 may implement remote metadata retrieval 650 which may request remote metadata 660 from different sources.

For example, remote metadata may be stored as part of an external data catalog service. When parser 610 parses query 602, a check may be performed to see if metadata for the referenced data in query 602 is found in local metadata. If not, remote metadata retrieval 650 may send a request to a remote data source, such as a metadata service or another service storing the remote data (e.g., to a database service or object storage service storing the data). In some embodiments, query 602 may include references to remote data according to a default schema name that may allow for the check in local metadata 640 to be skipped and a request for remote metadata 660 sent. Query rewriter 620 may perform similar rewrite operations as discussed above with respect to operations or portions of the parsed query to be executed remotely at format impendent data processing service 220, such as changing the location or ordering of predicates, join operations, or other portions or operations in the query tree.

The rewritten query may then be provided to plan generator 630. Plan generator 630 may perform various operations to generate a query execution plan (e.g., a tree of plan operation nodes, which may be later used to generate query execution code). For example, plan generator may perform a cost-based optimization to select one of various combinations or orderings of plan operator nodes in a tree produces a least costly plan to execute. Plan generator 630 may also implement remote operation selection 634 to assign the performance of different operations for remote data processing. For example, as noted above, remote data processing operations may include operations that scan operations that filter or project data results, aggregation operations that aggregate data values and provide partial or complete aggregation results, sorting, grouping, or limiting operations that organize or reduce the determined data results from remote data. FIGS. 7A-11C, discussed below provide different examples of remote operation selection 634 that may be performed, including the identification and replacement of data sharing operations that may be initially selected for local processing and replaced with operations that cause result distributions to remotely performed. More generally, remote operation selection 634 may apply various rules-based selection techniques to determine which operations should be pushed down or assigned for remote data processing at format independent data processing service. For example, rules or mapping information identifying local data sharing operations and when those data sharing operations should be replaced with remote result distribution operations may be implemented in order to intelligently relocating data sharing operations in some embodiments. In some embodiments, modifications to a query plan may be implemented or performed dynamically based on intermediate results from previously executed portions of the query plan. For example, conditional statements or other logical operators may be included in the query plan that indicate which operation to perform locally or direct remotely based on the intermediate results of previously performed operations.

Some operations may be partially performed. For example, aggregation operations, may not be completed before results are transmitted to the compute node. Instead, the compute node may aggregate a stream of partial results (e.g., as discussed with regard to FIG. 12 below) to determine the complete aggregation results for the remote aggregation operation. Then, the compute node perform operations to combine or otherwise process the aggregation results with other operations performed by the compute node (e.g., local data processing operations) and provide both remote and local processing results to a leader node for global aggregation across all compute nodes in the processing cluster. Remote operation selection 634 may implement greedy selection algorithms to select operations for remote data processing. However, in some embodiments, remote operations election 634 may decline to push or assign operations for remote processing that could be pushed or assigned based on a cost analysis. For example, depending on the cardinality of an aggregation operation (e.g., number of results for values being aggregated), assigning partial aggregation operation may not be beneficial. If the number of result values is large, then remote processing aggregation may not beneficial as the problem size for executing the aggregation would not be reduced if performed remotely, wasting processing, memory, or other resources.

As part of assigning operations for remote processing remote operation selection 634 may modify the query plan to include data plan operation nodes that correspond to assigned operations. For example, remote operation selection 634 may insert a plan node that represents scanning operations to be directed by a compute node (e.g., compute node 520) and performed at a processing node (e.g., processing node 540) part of a subquery for executing the query. This remote scanning node may identify which operations are assigned for remote execution (e.g., result distribution operations) and may be annotated with a corresponding interface command to execute the operation remotely (e.g., a format independent data processing service 220 API) as well as specific data that should be scanned (e.g., partition, file, table, or other data object identifiers). The remote scanning node may include predicates, regular expressions or other information for projections, filters, or limitations (e.g., a SQL limit clause) to be applied as part of the scan operation.

Another example of a plan node for a remote operation may be a remote aggregation plan node. Different types of associative aggregation operations (e.g., count, minimum value, maximum value, average, summation, deviation, or other statistical calculations) may be identified by the aggregation operation plan node. A grouping indication (e.g., a SQL group by clause) may identify the associate values over which aggregation functions are applied. Another example of a remote planning node for a remote operation may be a remote sort node. Different types of sortation and merge of results obtained from a remote data store can be remotely performed (e.g., a radix sort or other sort operation where partitioned search results can be merged). Another example of a plan node for a remote operation may be result distribution node which may indicate the mapping, function or other input information to determine which nodes should receive a result generated by as part of remote processing, in some embodiments.

Plan generator 630 may implement remote operation distribution 636 to determine which compute nodes may direct (e.g., request and process returned results) remote data processing operations. For example, in at least some embodiments a round-robin distribution scheme may be implemented to ensure that each compute node handles fair share of remote data processing workload. Distribution schemes may account for the number of data objects to be evaluated or the size of data objects to be evaluated when distributing remote data processing operations.

Plan generator 638 may implement remote operation request generator 638. In some embodiments, remote operation request generator 638 may populate a template, message, request, or other data structure for directing remote data processing operations. A remote data processing client, such as remote data processing clients 526 in FIG. 5, may interpret, access, or utilize the data structure to send remote data processing requests to format independent data processing service. In some embodiments, plan generator 630 may generate query execution code or other execution instructions 604 to perform the query plan. The query execution instructions 604 may access data structures generated for remote operation requests to generate code for executing remote data processing operations, in some embodiments.

Different types of queries may result in different query operations that share data which may be identified and replaced in order to relocate the data sharing operations, in various embodiments. For example, FIG. 7A illustrates a query 710 that selects and joins 712 data from two tables ("A" and "B") where the "shipdate" from "A" equals the "shipdate" from "B." The tables may be remote tables (e.g., in a remote data store, such as a storage service 230 rather than in a data processing service that receives the query, like data warehouse 300). A query planner, such as query planning 512 discussed above with regard to FIG. 6, may parse query 710 in order to determine a query plan for processing the query.

For example, FIG. 7B illustrates a query plan that may be generated including operations for local processing 720 and remote processing 730. A hash join 722 for instance, may join the results other operations according to hash table built on the join key (e.g., "shipdate"). The other operations may include remote operations, such as a scan of table "A" 726 to obtain "shipdate" from table "A." Similarly, a remote scan operation 736 may be included to scan table "B" for "shipdate." Operations to receive the remote data from for the respective tables, 726 and 734, may be included. In order to ensure that the appropriate nodes in the nodes processing the query (e.g., a data warehouse cluster) receive the data to which the node is responsible for processing (e.g., according to a hash function), distribution operations 724 and 732 may be included or order to cause a node in the cluster to share data with other nodes in the cluster in order to perform hash join 722.

FIG. 7C illustrates a modified query plan that replaces operations that share data at local processing nodes 720 with another query operation that performs local processing 730, in some embodiments. Similar to the plan in FIG. 7B a hash join 722 may be included as well as instructions to receive remote data 726 and 734 from node(s) implementing remote processing 730. Different operations, operations to distribute results 742 and 744 may be included in remote processing 730, along with remote scan operations 728 and 736. In this way, remote processing nodes may be caused by the operations to obtain (e.g., 728 and 736) and send the results to the appropriate nodes that perform hash join 722 according to the result distribution operations. Because the distribution operations are shifted to remote processing 730, nodes in local processing 720 may receive results from table "A" that are co-located with the results from table "B," saving local processing 720 from significant processing overhead to distribute the data amongst nodes in the local processing cluster (as may be incurred by the plan identified in FIG. 7B.

Another example query is illustrated in FIG. 8A. Different locations of data may also benefit from relocating data sharing operations. In query 810 both a remote table and local table may be joined 812 (e.g., the remote table may be a fact table and the local table may be a dimension table. Query 810, for instance, joins table "C" according to data from table "L" and performs group by (by "name"), order by (by "3") and limit operations (of "20") in order to perform a query that finds the top 20 biggest spending customers. FIG. 8B illustrates an example query plan including different operations that may be included to perform query 810. For example, local processing 820 may include a hash join 822 to join the results of table "C" and table "L." Local processing 820 may include an operation to receive (and thus request from) remote data 824. Consequently, remote processing 830 may include a remote scan operation that can project and filter items in table "C" in order to return results for local processing 820. Scan operation 832 (of table "L") may be performed and the results of that scan may be broadcast 828 to various nodes performing local processing 820 in order to complete performance of the query.

FIG. 8C illustrates a modified query plan that replaces broadcast operation 828. Instead an operation to distribute results 842 may be included in remote processing 830 in order to prove the results of remote scan 826 to the appropriate nodes performing local processing 820. For example, distribute results operation 842 may distribute the results of remote scan 826, the results from the fact table, according to a distribution column that is retrieved from the scan of table "L", the dimension table. In this way, no further broadcast of the dimension table may need to be performed—instead the appropriate results may be preemptively sent to the appropriate nodes performing local processing 820.

Another example query is illustrated in FIG. 9A. Query 910 may illustrate an example where a query plan that is generated based on a mistaken, unknown, or other cardinality-based decision can be ameliorated by relocating a data sharing operation. In some embodiments, federate processing of queries may be performed without knowledge of remote data. The cardinality of data in a remote data store, for instance, may not be known when generating and/or optimizing a query plan. Query 910 illustrates an example of a query that is similar to TPC-H Q21 (an example query pattern from the Transaction Processing Performance Council (TPC)). The number of items that maybe returned from the table "L1" in the remote store (e.g., the cardinality) may be unknown or unable to be estimated 912. FIG. 9B illustrates an example query plan for performing query 910 that may be generated. As in previous examples, a hash join 922 may be implemented to join the results of local table "0" scan operation 924 and a remote scan operation 930 of table "L1" and the remote aggregation operation 932 that may be performed in order to perform the "COUNT" of query 910. The aggregated results may be received according to operation 928 and a broadcast and distribution of the results 926 performed to send the data to the nodes performing local processing 920 in order to perform hash join 922.

FIG. 9C illustrates a modified plan that replaces the broadcast distribute operation 926 with a remote operation to distribute data 942. While the plan illustrated in FIG. 9B may have good performance if the received results from remote processing 930 are small, large returned results could significantly increase the performance costs of implementing the plan in 9B. The modification to include distribution operation 942 may prevent the unknown or mistaken cardinality from affecting the performance of the query in the plan of FIG. 9C, as the distribution of results in operation 942 may be more performant when executed by remote processing 930 node(s) than the worst case scenario where results are large and the best case scenario where the results are small, in some embodiments.

Figure 10A:
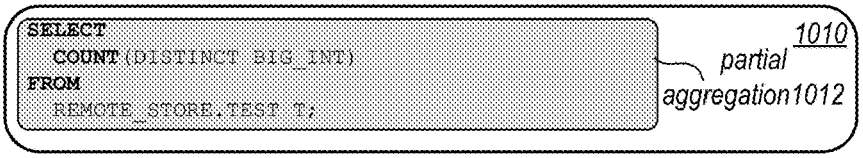
FIGS. 10A-10C are logical block diagrams illustrating modifications to a query plan to relocate a data sharing operation for remote processing when performing partial aggregations of remote data, according to some embodiments.
Figure 10B:
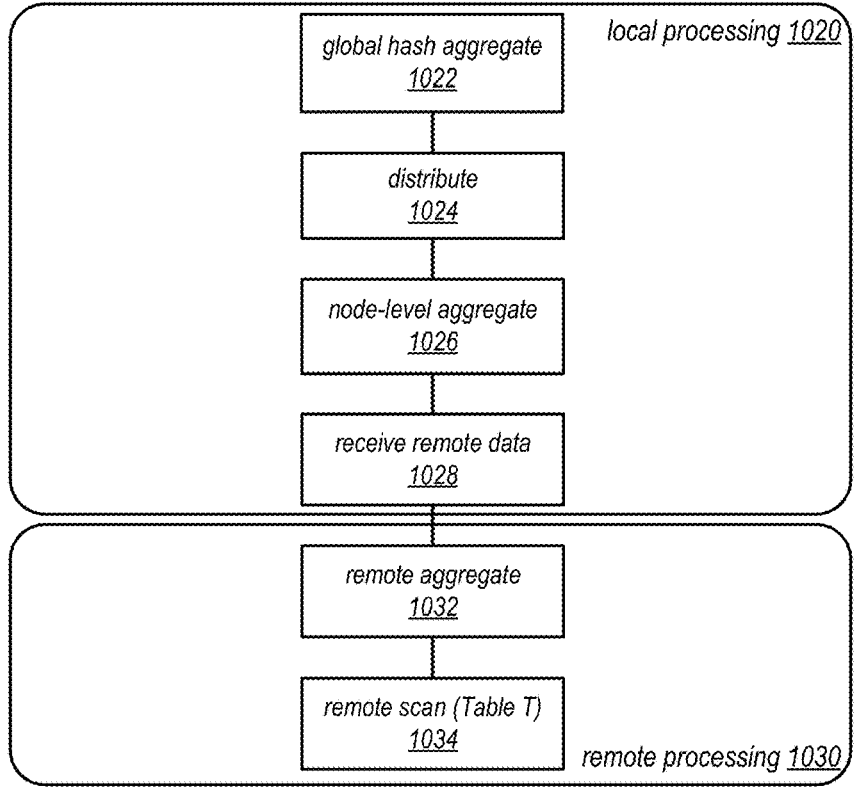
Figure 10C:
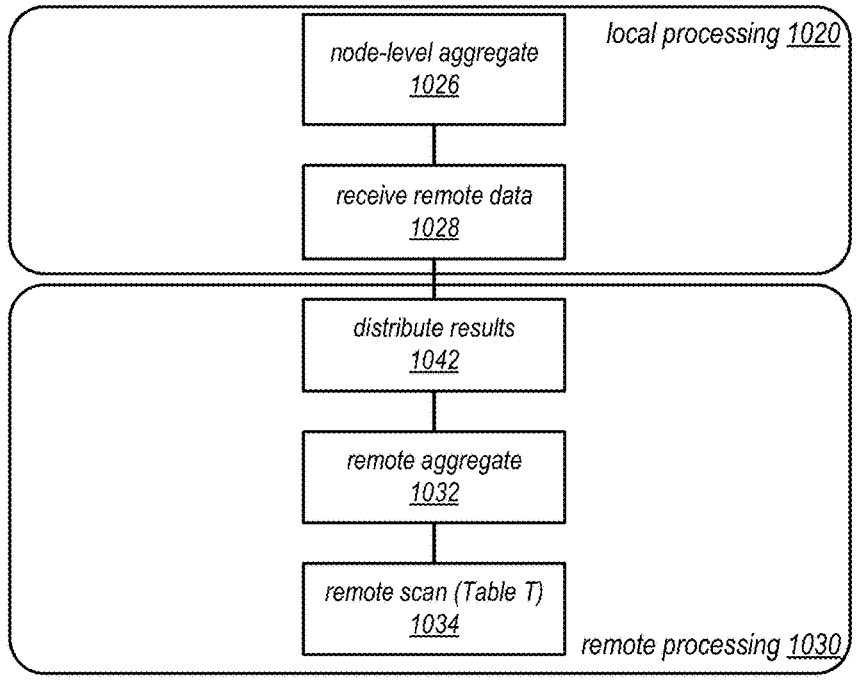

FIG. 10A illustrates another example query that may benefit from relocating a data sharing operation. Query 1010 may request an aggregation of data 1012 (by the "COUNT" operation) from a table stored remotely, table "T." Because aggregation may include operations that send partially aggregated data (e.g., in scenarios where the completion of the aggregation may exceed resource limitations of a node or nodes performing remote processing 1030), the example plan illustrated in FIG. 10B to perform query 1010 may include multiple other aggregation operations to combine the partially aggregated results received at 1028, such as global hash aggregation 1022 and node-level aggregation 1026. Distribution operation 1024 may shuffle or otherwise provide the aggregated results to other nodes in order to perform final aggregations at any other nodes that may need to include the results to complete the aggregation. In FIG. 10C, relocating data sharing to include the distribution of results operation 1042 in remote processing 1030 as part of the modified plan, may provide the nodes performing local processing 1020 with the appropriate data to perform an aggregation without receiving data from another node of local processing 1020, which may eliminate the need to perform a global hash aggregation, reducing the number of operations in the plan to perform the query, in some embodiments.

The previous examples of queries have provided examples where processing responsibility at nodes performing local processing may be assigned according to hash-based partitioning or distribution scheme. In other embodiments, other distribution schemes like range-based partitioning may be implemented. Other remote operations may available in such embodiments, such as sorting operations like a radix sort. FIG. 11A provides an example query 1110 that may include a request that invokes a partial sort 1112 at remote processing. For instance, an example plan that may be implemented is illustrated in FIG. 11B, may include operations to perform all sorting as part of local processing 1120 so that once data is received 1128 from a remote scan 1132 of table "T2", node level sorts 1126, shuffle of the data to one node 1124 and final global sort merge 1122 may be performed. Relocating the sharing operation to remote processing 1130, including result distribution 1142 (which in the example of a radix sort may distribute results according to a specified set of bits of a sort key that maps to a range of values assigned to a partition according to range-based partitioning) may allow for a partial sort operation 1144 to also be performed as part of remote processing—which in turn may eliminate the need to perform a global sort merge 1122 as part of local processing. Processing node(s) of local processing 1120 may instead receive the remote data 1128 so that the only sort that needs to be performed is node-level sort 1126.

Please note that the previous examples are some of the many combinations operations that may be pushed down or assigned to remote data processing, and thus are not intended to be limiting. In other circumstances different modifications can be achieved.

Figure 12:
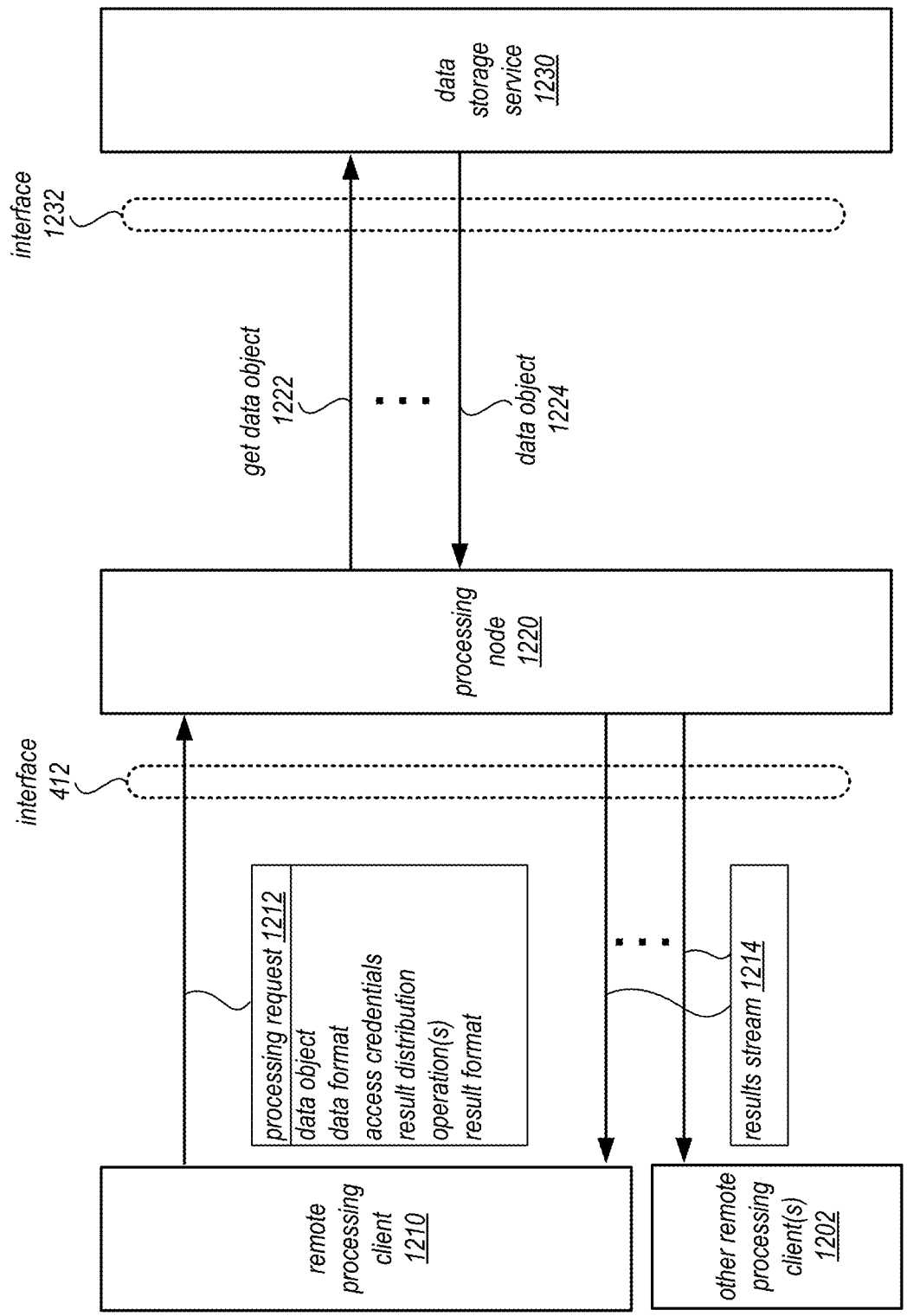
FIG. 12 is a logical block diagram illustrating interactions between a remote processing client and a processing node of format independent data processing service to execute a processing request, according to some embodiments.

FIG. 12 is a logical block diagram illustrating interactions between a remote processing client and a processing node of format independent data processing service to execute a processing request, according to some embodiments. Remote processing client 1210 may be a data processing engine implemented by a single node (e.g., a single database server) or multiple nodes (e.g., a data processing cluster like processing cluster 500 in FIG. 5). Similarly, other remote processing client(s) 1202 may be implemented as part of other node(s) (e.g., other nodes in a data processing cluster like processing cluster 500 in FIG. 5). Remote processing client 1210 may be an external data processing engine (single node or cluster of nodes) operating external to provider network 200. For example, an organization may implement database systems that process local data within a private network. Older data may be stored remotely in a data storage service in provider network 200. The external data processing engine may then execute queries that target both local data within the private network and data stored in the provider network by sending processing requests 1212 to format independent data processing service 220, which may be performed by processing node 1220. In this way, cold or infrequently accessed data stored separately may still be accessible to queries.

Remote processing client 1210 may send processing request 1212 via interface 412 (e.g., an API) which may be dispatched (load balancing and/or other front-end processing components that dispatch requests not being illustrated) to processing node 1220. Processing request 1212 may include various kinds of information to perform the remote processing information. For example, processing request 1212 may include an identifier for the data object (e.g., a key value, a filename, a partition or table id, etc.). Processing request 1212 may include the data format or schema (e.g., a type of column-oriented data format such as Optimized Row Columnar (ORC) or Parquet, a type of semi-structured data such as Comma Separated Values (CSV) or Extensible Markup Language (XML), etc.) in which the data is stored in remote data storage service 1230. In some embodiments, processing request 1212 may include access credentials (e.g., a token, username and password, etc.) as well as an identification of an encryption scheme according to which the data object is stored and/or a compression scheme according to which the data object is stored (not illustrated). Processing request 1212 may specify the operation(s) to perform partial or full (e.g., scanning operations including predicates, regular expressions or other information for projections, filters, or limitations, aggregation operations that count or determine minimum values, maximum values, averages, summations, deviation, or other statistical calculations, or groupings, sort orders, or other indications that determine how results are to be combined, calculated or presented). Processing request 1212 may include a result format which may be different than the format that the data is stored in in data storage service 1230 (e.g., convert data from CSV to ORC). Processing request 1212 may include a result distribution instruction or other information to identify which remote processing clients, such as remote processing clients 1210 and 1202, should receive which portion of results obtained by performing the instructed operations, as discussed in detail below with regard to FIG. 16.

Processing node 1220 may perform one or more multiple requests 1222 get and return objects 1224 from data storage service 1230. These requests may be formatted according to an interface 1232, such as an API. Once the data objects (or portions of the data objects) are retrieved 1224, processing node may perform the requested operations, such as the various operations discussed above with regard to FIGS. Processing node 1220 may provide results as a stream 1214 to remote processing client 1210 and/or other remote processing client(s) 1202. For example, processing node 1220 may perform data processing in memory and therefore may have limited capacity to store intermediate or incomplete results (e.g., aggregation results). Processing node 1220 may send intermediate results as part of results stream. Results stream may also be a stream of filtered, projected, sorted, or other data values as requested in processing request 1212. If processing node 1220 fails before or during processing of the request 1212, remote processing client 1210 may retry the request, as discussed below with regard to FIG. 15.

Figure 13:
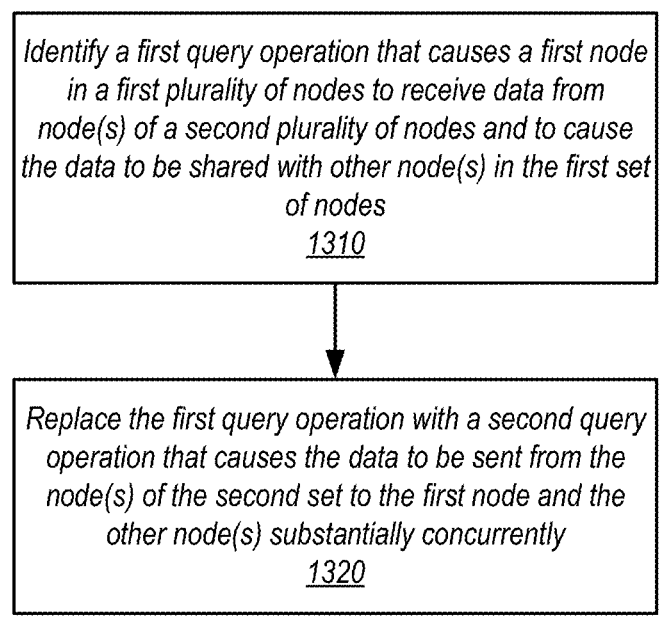
FIG. 13 is a high-level flowchart illustrating methods and techniques to implement relocating data sharing operations for query processing, according to some embodiments.

Although FIGS. 2-12 have been described and illustrated in the context of a provider network implementing different data processing services, like a data warehousing service, the various components illustrated and described in FIGS. 2-12 may be easily applied to other data processing systems that perform format independent data processing on behalf of clients. As such, FIGS. 2-12 are not intended to be limiting as to other embodiments of format independent data processing for distributed data. FIG. 13 is a high-level flowchart illustrating methods and techniques to implement relocating data sharing operations for query processing, according to some embodiments. Various different systems and devices may implement the various methods and techniques described below, either singly or working together. For example, a local or remote processing node, such as described above with regard to FIG. 4, may implement some or all of the various methods. Different combinations of services implemented in different provider networks operated by different entities may implement some or all of the methods (e.g., a data warehouse cluster in a service of a first provider network, an intermediate data processing service in a second provider network, and a data set stored in a service of a third provider network). Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 1310, a first query operation that causes a first node in a first set of nodes to receive data from node(s) of a second set of nodes and to cause the data to be shared with other node(s) in the first set of nodes, as indicated at 1310. For example, query operation types may be maintained in a data structure (e.g., a lookup table) or other information that indicate whether or not the operation results in sharing or otherwise sending data amongst different nodes in the first plurality of nodes (e.g., nodes of a distributed processing platform, database, or other data processing cluster, set, group, or service, like data warehouse processing cluster 500 in FIG. 5). In some embodiments, the identification of a query operation may include other or additional criteria, such as the cost of performing the query operation. If, for instance, an estimated cardinality (e.g., an estimated number of results) of the data sent from the second plurality of nodes is greater than some threshold amount, then the query operation may be identified for replacement. In some embodiments, a replacement operation (the second query operation) may be assigned a low cost or weight so that a query optimizer may recognize or identify that the replacement operation has better performance than the first operation.

The second plurality of nodes may be nodes of a service, such as format independent data processing service 220, which may operate in a multi-tenant or non-exclusive fashion performing query operations for different queries from different clients with respect to the data, in some embodiments. The second plurality of nodes may be one or more nodes of another data processing platform or engine (which may be different than or the same as a data processing platform or engine implemented in the first plurality of nodes), such as another data warehouse cluster, a map-reduce cluster, or other distributed processing framework, in some embodiments.

As indicated at 1320, the first query operation may be replaced with a second query operation that cause the data to be sent from the node(s) of the second plurality of nodes to the first node and the other nodes substantially concurrently, in various embodiments. The second query operation may, for example, be a result distribution instruction, as discussed above with regard to FIG. 12 and below with regard to FIGS. 13 and 16 may be sent to indicate which portions of results may be directed to which nodes in the first plurality of nodes. For example, mapping information which identifies how items or objects within the data (e.g., records, rows, fields, etc.) are distributed for processing amongst the first plurality of nodes may be provided. The second query operation may correspond to the operation that it replaces, in some embodiments. If, for instance, the replaced operation is a broadcast operation (e.g., to send a same set of data to other nodes), then the distribution instruction may include corresponding instruction to broadcast the data to the other nodes (or include an instruction that achieves the same result as if the first node had performed the broadcast operation). Likewise, if the replaced operation is a shuffle operation (e.g., to send different portions of data to other nodes), then the distribution instruction may include corresponding instruction to shuffle the data to the other nodes (or include instruction that achieves the same result as if the first node had performed the broadcast operation).

Substantially concurrent sending of data from the node(s) of the second plurality may be performed in different ways. For instance, the node(s) of the second plurality may rotate the distribution of data obtained amongst different nodes in the first plurality (e.g., according to a round-robin style distribution), in some embodiments. Substantially concurrent sending of data from the node(s) may be performed by multiple nodes of the second plurality, each of which may send results to different nodes or to the same nodes in or near parallel, in some embodiments.

Figure 14:
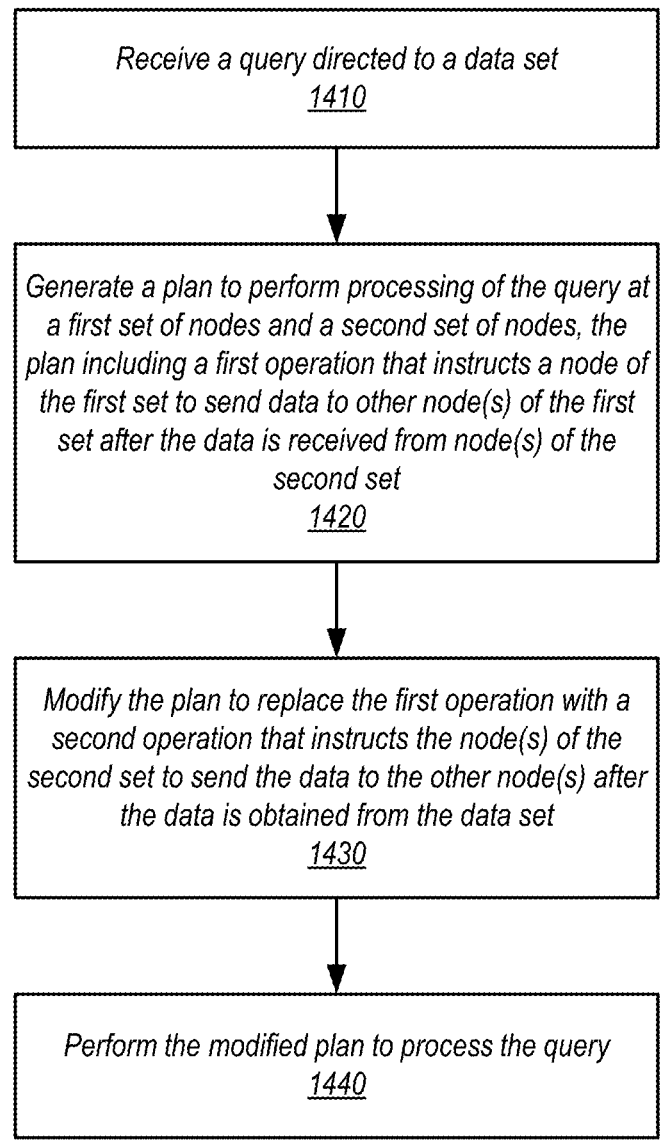
FIG. 14 is a high-level flowchart illustrating methods and techniques to perform federate processing of a query that relocates a data sharing operation generated as part of a plan for performing the query to remote processing, according to some embodiments.

Relocating a data sharing operation may be performed as part of query plan generation and/or optimization in various embodiments. FIG. 14 is a high-level flowchart illustrating methods and techniques to perform federate processing of a query that relocates a data sharing operation generated as part of a plan for performing the query to remote processing, according to some embodiments. As indicated at 1410, a query may be received that is directed to a data set. The query may be received via a programmatic interface (e.g., according to an API) or according to a standardized protocol or language (e.g., structured query language (SQL). In some embodiments, the data set may be distributed across different data stores and in different formats. In some embodiments, the data set may be stored in locations remote or not directly accessible to nodes in the first set of nodes (but may be accessible to nodes in the second set), while in some embodiments the some of the data may be accessible to the nodes in the first data set, but not the second set. Various other combinations of storage locations, formats, and accessibility for data nodes may be implemented and thus the previous examples are not intended to be limiting.

As indicated at 1420, a plan to perform processing of the query at a first set of nodes and a second set of nodes, in some embodiments. For example, the query may be parsed, operations identified and arranged according to a plan in order to achieve the desired result of the query, such as illustrated in FIGS. 7B, 8B, 9B, 10B, and 11B. The plan may include a first operation that instructions a node of the first set to send data to other nodes in the first set (e.g., such as operations 724, 732, 828, 926, 1024, and 1124, or other shuffle, broadcast, share, copy, or redirect operations) after that data is received from node(s) of the second set. For example, the nodes of the second set may be one or more nodes that perform remote processing operation(s) for the query, as discussed above with regard to FIG. 5 which may have received an instruction from the node in the first to perform the remote processing operation(s).

As indicated at 1430, the plan may be modified to replace the first operation with a second query operation that instructs the node(s) of the second set to send the data to the other node(s) (and in some instances the requesting node) after the data is obtained (and in some instances modified, transformed, or otherwise used to generate the data) from the data set, in various embodiments. For example, the distribute result operations in FIGS. 7B, 8B, 9B, 10B, and 11B (726, 734, 842, 942, 1042, 1142) may instruct nodes that perform remote processing to send the results to nodes in the first set. Modification of the plan may include remove the first operation (or multiple operations), restructuring or reorganizing the ordering of instructions (e.g., in the plan hierarchy), and inserting the second query operation. As query plans may include different dependencies, other changes to operations or orderings operations may be performed as a result of replacing the first operation. For example, as illustrated in FIG. 10C, the modification of the plan may remove the node-level aggregation operation 1024.

As indicated at 1440, the modified plan may be performed to process the query, in various embodiments. Directions or other instructions to execute, process, or otherwise perform the modified query plan may be generated. In some embodiments, the modified query plan may be distributed to the different participating nodes in both the first set and second set. As is discussed above with regard to FIG. 5, the first set of nodes may be aware, receive, and carry out the modified plan and send instructions or requests to the node(s) in the second set according to the modified plan, in some embodiments.

Figure 15:
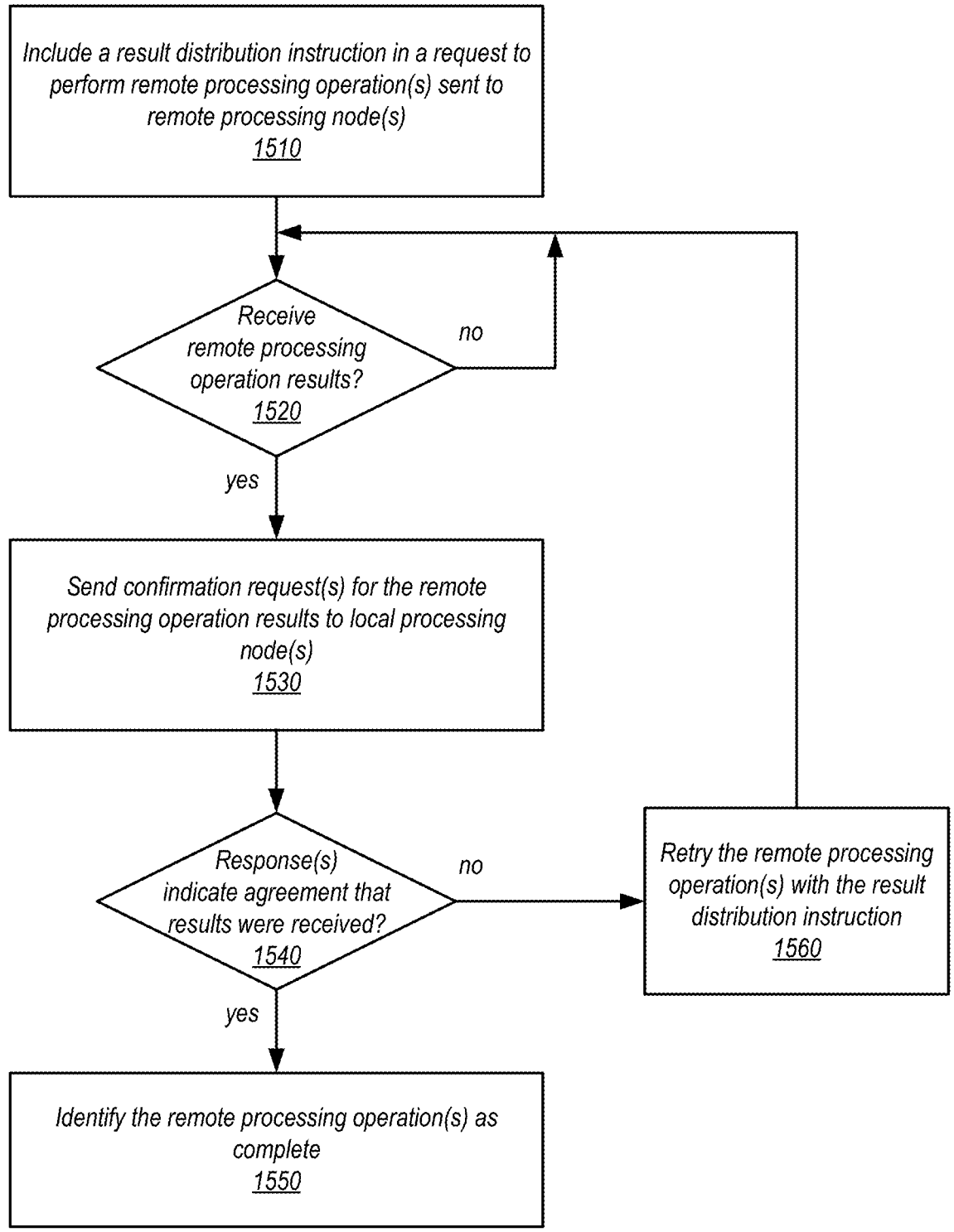
FIG. 15 is a high-level flowchart illustrating methods and techniques to determine whether remote processing operations that relocate data sharing operations are complete, according to some embodiments.

Because execution of data sharing techniques can be relocated for query processing, a determination as to whether the data sharing was successfully completed may not be determined based on the information that the originally requesting node for the relocation receives. Other nodes that are to receive data may suffer errors or connection problems with the remote processing nodes that share the data. The remote processing nodes may fail to send the data (e.g., due to remote processing node failure). Techniques to detect failure of operations that depend on shared data may be implemented in order to retry and successfully complete remote operations before continuing performance of other operations to process a query, in various embodiments. FIG. 15 is a high-level flowchart illustrating methods and techniques to determine whether remote processing operations that relocate data sharing operations are complete, according to some embodiments.

As indicated 1510, a result distribution instruction may be included in a request to perform remote processing operation(s) sent to remote processing nodes, in some embodiments. The result distribution instruction may, as discussed above, indicate a distribution scheme, mapping information, or other data that indicates the recipients of the data obtained and/or transformed at the remote processing node(s). As a single local processing node may be responsible for the performance of the remote processing operation(s), that the single local processing node may need to determine whether the remote processing operations completed successfully, including the sharing of the data with other local processing nodes.

As indicated at 1520, the results of remote processing operations may be received at the requesting local processing node. In some embodiments, the local processing node may wait to receive results before attempting to confirm whether other local processing nodes have received results, while in other embodiments, the local processing node may attempt confirm whether the other local processing nodes have received results within a period of time (e.g., in scenarios where the requesting node may not receive results back even if the remote operation is successfully performed).

If results are received, as indicated by the positive exit from 1520, then confirmation request(s) for the remote processing operation(s) may be sent, in some embodiments, to the other local processing node(s) that were to receive the data, as indicated at 1530. For example, a polling-based consensus technique may be implemented to have the local processing node request and determine based on the responses (e.g., confirming receipt of the data or indicating that the data has not been receipt, or is otherwise not complete), as indicated at 1540. If the responses do indicate agreement, then the remote processing operation(s) may be identified as complete, as indicated at 1550. The local processing node may send an indication or acknowledgement to the other nodes, for example, to treat the operation(s) as complete. If the response(s) do not indicate agreement, then as indicated by the negative exit from 1540, the remote processing operation(s) with the result distribution instruction may be retried, as indicated at 1560.

Various other consensus algorithms or techniques may be implemented between local processing nodes to determine whether the local processing nodes can treat remote processing operations as complete. For example, in some embodiments, two-phase commit protocol may be implemented to determine whether to commit or roll-back the remote processing operation(s) (in the event that incomplete data was received. In other example embodiments, Paxos-based consensus protocols, clock-based consensus techniques, or any other consensus protocols may be implemented to determine agreement as to whether remote processing operation(s) successfully completed and thus the previous examples are not intended to be limiting.

Figure 16:
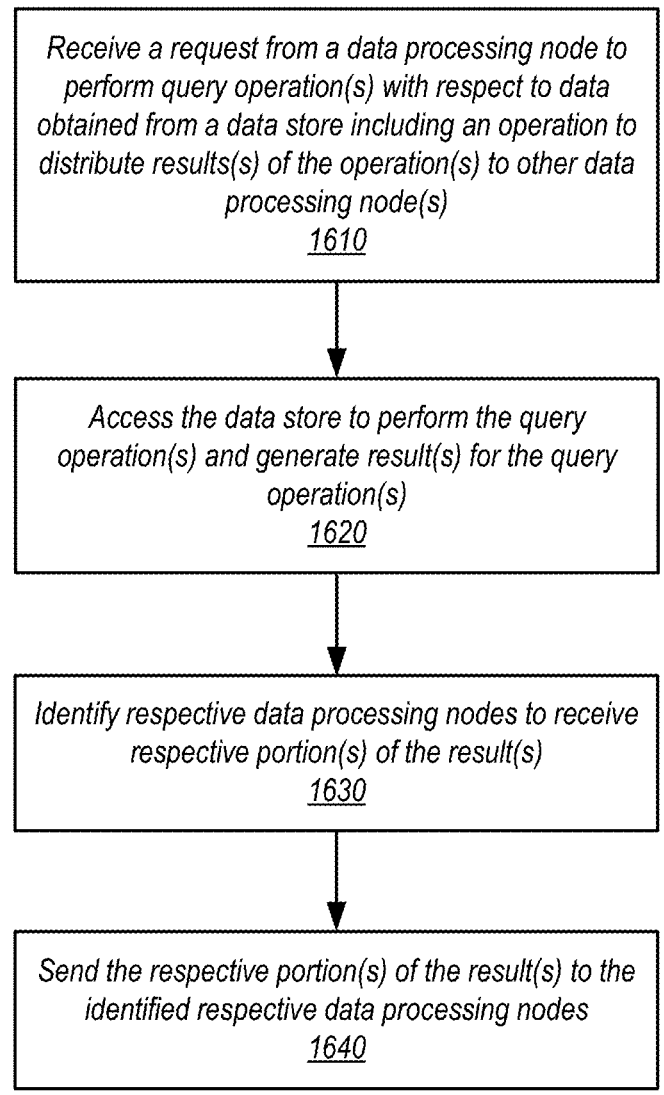
FIG. 16 is a high-level flowchart illustrating methods and techniques to identify data processing nodes to send results of remote processing operations, according to some embodiments.

The distribution of processing responsibility amongst local processing nodes may vary in different scenarios in order to optimize the processing of data within the set of local processing nodes. FIG. 16 is a high-level flowchart illustrating methods and techniques to identify data processing nodes to send results of remote processing operations, according to some embodiments. As indicated at 1610, a request from a data processing node may be received to perform query operation(s) with respect to data obtained from a data store including an instruction to redirect result(s) of the operation(s) to other data processing node(s). The result may also be sent to the requesting data processing node, as discussed above, in some embodiments.

As indicated at 1620, the data store may be accessed to perform the query operation(s) and generate result(s) for the query operation(s), in some embodiments. For example, the query operation(s) may include one or multiple operations, such as scanning operations (which may include predicates, regular expressions or other information for projections, filters, or limitations (e.g., a SQL limit clause) to be applied as part of the scanning operation), aggregation operations (which may be associative aggregation operations, such as counting, determining minimum value, determining maximum value, averaging, summing, determining deviation, or other statistical calculations), sorting operations, or grouping indications (which may identify the associate values over which operations are applied, such as a SQL group by clause). In some embodiments, the result(s) may be reformatted according to specified result format. For example, if the result(s) are generated from data in semi-structured format, the result(s) may be transformed into a structured data format. The results may be encrypted and/or compressed, in some embodiments.

As indicated at 1630, respective data processing nodes may be identified to receive respective portion(s) of the result(s), in some embodiments. For example, a hashing scheme may be implemented to distribute processing responsibility amongst the local processing nodes. In order to determine which portions of the result may be sent to which data processing nodes, a hashing function, for instance, may be applied to keys, values, or other information that is retrieved or associated with the results to determine a hash value for results. The hash values may then be used to lookup which data processing node is responsible for that hash value (e.g., according to hash value ranges mapped to the different data processing nodes). Other types of distribution schemes may include schemes that partition data according to ranges of data values (e.g., range partitioning amongst the data processing nodes). In such scenarios, the range value to which a result belongs or is associated with may be identified in order to identify the appropriate data processing nodes. In at least some embodiments, multiple data processing nodes may be identified to receive the same portion of the results (or all of the results).

As indicated at 1640, the respective portion(s) of the result(s) may be sent to the identified respective data processing nodes, in various embodiments. In some embodiments, the portions of results (e.g., counts for a data value) may be sent in streaming fashion so that the data processing engine(s) may be perform a final operation to determine a final result based on the received portion(s) of the result (e.g., sum the multiple counts received for the data value to determine a final sum for the data value). In some embodiments, all of the respective portion result(s) may be sent in a single response to an identified data processing node.

The methods described herein may in various embodiments be implemented by any combination of hardware and software. For example, in one embodiment, the methods may be implemented by a computer system (e.g., a computer system as in FIG. 17) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of relocating data sharing operations for query processing as described herein may be executed on one or more computer systems, which may interact with various other devices. One such computer system is illustrated by FIG. 17. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 17, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive a query directed to a data set;
generate a plan to perform processing of the query at a first set of processing nodes and a second set of processing nodes, wherein the plan includes a first operation that instructs one processing node of the first set of processing nodes to send data to another processing node of the first set after the data is received from one or more processing nodes of the second set;
modify the plan to replace the first operation with a second operation that instructs the one or more processing nodes of the second set to send the data to the other processing node of the first set after the data is obtained from the data set; and perform the modified plan to process the query.

2. The system of claim 1, wherein to perform the modified plan, the method causes the at least one processor to:
send, from the one processing node of the first set, a request to perform the second operation to the one or more processing nodes of the second set;
send, from the one processing node of the first set, a confirmation request to the other processing node of the first set; and
determine, by the one processing node of the first set, that the data was received at the other processing node based, at least in part, on a response to the confirmation request.

3. The system of claim 1, wherein to perform the modified plan, the method causes the at least one processor to:
receive, at the one or more processing nodes of the second set, a request to perform the second operation;
access a data store to obtain the data;
identify the other processing node of the first set to receive at least a portion of the data; and
send the portion of the data to the other processing node of the first set.

4. The system of claim 1, wherein the first set of processing nodes is implemented as part of a processing cluster of a data warehouse service of a provider network, wherein the second set of processing nodes is implemented as part of a format independent data processing service of the provider network, and wherein the data of the data set is obtained from a data storage service implemented as part of the provider network.

5. A method, comprising:
performing, by one or more computing devices:
identifying a first query operation that causes a first processing node in a first plurality of processing nodes to receive data from at least one processing node of a second plurality of processing nodes and to cause the data to be shared with at least one other processing node in the first plurality of processing nodes; and
replacing the first query operation with a second query operation, wherein the second query operation causes the data to be sent from the at least one processing node of the second plurality of processing nodes to the first processing node and the at least one other processing node in the first plurality of processing nodes substantially concurrently.

6. The method of claim 5, further comprising:
receiving a query directed to a data set that includes the data;
in response to receiving the query:
generating a plan to perform the query including a plurality of query operations and the first query operation;
performing the identifying and the replacing;
wherein replacing the first query operation with the second query operation modifies the plan to replace the first query operation; and
causing the first plurality of processing nodes and the second plurality of processing nodes to perform the modified plan.

7. The method of claim 6, wherein the query operations of the plan include a join operation to join the data with other data obtained by the second plurality of processing nodes.

8. The method of claim 6, wherein the plan is further modified to include an operation to perform at least part of an aggregation to obtain the data at the one or more processing nodes of the second plurality of processing nodes.

9. The method of claim 5, further comprising:
receiving, at the at least one processing node of the second plurality of processing nodes, a request to perform the second query operation and at least one other query operation from the first processing node;
accessing, by the at least one processing node of the second plurality of processing nodes, a data store to perform the at least one other query operation to obtain the data;
identifying, by the at least one processing node of the second plurality of processing nodes, the first processing node and the at least one other processing node to receive at least a portion of the data; and
sending, by the at least one processing node of the second plurality of processing nodes, the portion of the data to the first processing node and the at least one other processing node of the first plurality of processing nodes.

10. The method of claim 9, wherein identifying the first processing node and the at least one other processing node to receive at least a portion of the data comprises applying a hash-based distribution scheme to at least a portion of the data.

11. The method of claim 5, further comprising:
sending, from the first processing node of the first plurality of processing nodes, a request to perform the second query operation to the one or more processing nodes of the second plurality of processing nodes;
sending, from the first processing node of the first plurality of processing nodes, a confirmation request to the at least one other processing node of the first plurality of processing nodes; and
determining, by the first processing node of the first plurality of processing nodes, that the data was received at the at least one other processing node based, at least in part, on a response to the confirmation request.

12. The method of claim 5, further comprising:
sending, from the first processing node of the first plurality of processing nodes, a request to perform the second query operation to the one or more processing nodes of the second plurality of processing nodes;
sending, from the first processing node of the first plurality of processing nodes, a confirmation request to the at least one other processing node of the first plurality of processing nodes;
determining, by the first processing node of the first plurality of processing nodes, that the data was not received at the at least one other processing node based, at least in part, on a response to the confirmation request; and
in response to the determination that the data was not received at the at least one other processing node, retrying the request to perform the second query operation to the at least one processing node of the second plurality of processing nodes.

13. The method of claim 5, wherein the identifying and the replacing are performed by a query planner.

14. A non-transitory, computer-readable storage medium, storing program instructions that when executed by one or more computing devices cause the one or more computing devices to implement:
identifying a first query operation of a query that causes a first processing node in a first plurality of processing nodes to receive data from at least one processing node of a second plurality of processing nodes and to cause the data to be shared with at least one other processing node in the first plurality of processing nodes as part of a plan to perform the query;

replacing the first query operation with a second query operation to modify the plan, wherein the second query operation causes the data to be sent from the at least one processing node of the second plurality of processing nodes to the first processing node and the at least one other nodes processing node in the first plurality of processing nodes substantially concurrently; and causing the first plurality of nodes and the second plurality of nodes to perform the query according to the modified plan.

15. The non-transitory, computer-readable storage medium of claim 14, wherein the program instructions cause the one or more computing devices to further implement:

receiving a query directed to a data set that includes the data;

in response to receiving the query:
generating the plan to perform the query including a plurality of query operations and the first query operation; and
performing the identifying, the replacing, and the causing.

16. The non-transitory, computer-readable storage medium of claim 15, wherein the query operations of the plan include a join operation to join the data with other data obtained by the first plurality of processing nodes.

17. The non-transitory, computer-readable storage medium of claim 15, wherein the plan is further modified to include an operation to perform at least part of a sort of the data at the at least one processing node of the second plurality of processing nodes.

18. The non-transitory, computer-readable storage medium of claim 14, wherein, in causing the first plurality of processing nodes and the second plurality of processing nodes to perform the query according to the modified plan, the program instructions cause the one or more computing devices to implement:

receiving, at the at least one processing node of the second plurality of processing nodes, a request to perform the second query operation and at least one other query operation from the first processing node;

accessing, by the at least one processing node of the second plurality of processing nodes, a data store to perform the at least one other query operation to obtain the data;

identifying, by the at least one processing node of the second plurality of processing nodes, the first processing node and the at least one other processing node to receive at least a portion of the data; and sending, by the at least one processing node of the second plurality of processing nodes, the portion of the data to the first processing node and the at least one other processing node of the first plurality of processing nodes.

19. The non-transitory, computer-readable storage medium of claim 18, wherein identifying the first processing node and the at least one other processing node to receive at least a portion of the data comprises applying a range-based distribution scheme to at least a portion of the data.

20. The non-transitory, computer-readable storage medium of claim 14, wherein the first plurality of processing nodes is implemented as part of a processing cluster of a data warehouse service of a provider network, wherein the second plurality of processing nodes is implemented as part of a format independent data processing service of the provider network or another provider network.

\* \* \* \* \*